United States Patent
Pekowski et al.

(10) Patent No.: US 6,721,763 B1
(45) Date of Patent: *Apr. 13, 2004

(54) AUTOMATED CONVENTION PROCESSING SYSTEM AND METHOD

(75) Inventors: Randall J. Pekowski, The Colony, TX (US); April E. Hurley, Dallas, TX (US); Brian D. Kleinfall, Richardson, TX (US); Michael S. Moorehead, Arlington, TX (US)

(73) Assignee: The Expo Group, L.P., Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/365,754

(22) Filed: Feb. 12, 2003

Related U.S. Application Data

(63) Continuation of application No. 09/440,601, filed on Nov. 15, 1999, now Pat. No. 6,557,007.

(51) Int. Cl.[7] ............................................. G06F 17/00
(52) U.S. Cl. ...................... 707/104.1; 707/10; 707/100; 705/26
(58) Field of Search .................. 707/1–10, 100–104.1; 705/26; 345/751, 753, 759

(56) References Cited

U.S. PATENT DOCUMENTS

| | | | |
|---|---|---|---|
| 4,654,793 A | * 3/1987 | Elrod | 705/1 |
| 4,806,743 A | * 2/1989 | Thenery | 235/462.45 |
| 5,310,997 A | * 5/1994 | Roach et al. | 235/375 |
| 5,664,110 A | * 9/1997 | Green et al. | 705/26 |
| 5,910,896 A | 6/1999 | Hahn-Carlson | 700/231 |
| 5,936,542 A | 8/1999 | Kleinrock et al. | 340/5.61 |
| 6,012,035 A | 1/2000 | Freeman, Jr. et al. | 235/379 |
| 6,058,373 A | 5/2000 | Blinn et al. | 705/22 |
| 6,061,057 A | 5/2000 | Knowlton et al. | 345/744 |
| 6,246,998 B1 | * 6/2001 | Matsumori | 705/27 |
| 6,272,332 B1 | 8/2001 | Matsumoto et al. | 455/412 |
| 6,421,653 B1 | * 7/2002 | May | 705/37 |
| 2001/0014865 A1 | * 8/2001 | Franke | 705/1 |

FOREIGN PATENT DOCUMENTS

| | | | |
|---|---|---|---|
| WO | 00/39694 | 6/2000 | G06F/15/00 |

OTHER PUBLICATIONS

CoPro 3 Plus by Polaris Business Systems, Copyright Polaris Business Systems, 1991, pp. 1–98.*
CoPro 3 Plus by Polaris Business Systems; Copyright Polaris Business Systems, 1991; pp. 1–98, Sep. 23, 1991.
EXPOweb News, 10 pages headlines and articles, Jul. 24, 2003.
MeetingNews.com, News Article dated Aug. 11, 2003, website http://www.meetingnews.com/meetingnews/search/search_display.jsp?vnu_content_id=1953918, 3 pages, Aug. 11, 2003.

* cited by examiner

*Primary Examiner*—Greta Robinson
*Assistant Examiner*—Linh Black
(74) *Attorney, Agent, or Firm*—Baker Botts L.L.P.

(57) ABSTRACT

A convention processing system is provided that includes software operable to store show information identifying at least one show in which a plurality of exhibitors will exhibit their wares, service information identifying a plurality of services available to the exhibitors at the show, supplier information identifying at least one supplier for each of a plurality of service items and a plurality of different suppliers. The software is further operable to access the information, display the services for the show, receive a selection of a service item, and store the selection of the service item as an order.

32 Claims, 51 Drawing Sheets

BACK 164

LOGOUT 180

THE EXPO GROUP

Add Show
230

218

| SHOW INFORMATION | | | 220 |
|---|---|---|---|
| SHOW ID NUMBER: | Assigned by the system. | SHOW DATE: | 232 |
| SHOW NAME: | 234 | FACILITY: | 236 |
| ADDRESS 1: | 238 | CITY: | 238 |
| ADDRESS 2: | | STATE: | -- 238 ▼ |
| COUNTRY: | -- 238 ▼ | ZIP CODE: | 238 |
| SYSTEM INFORMATION | | | 222 |
| DEFAULT JOB NO: | 250 | SALES TAX: | 252 |
| CONTROL DATE: | 254 | DISCOUNT DEADLINE DATE: | 256 |
| BASE AMOUNT: | 258 | DISCOUNT PERCENT: | 260 |
| RESOURCE INFORMATION | | | 224 |
| PROJECT MGR: | April Hurley ▼ 262 | ACCOUNT EXEC. | Barbara Fett ▼ 264 |
| SHOW OWNER: | 270 | | |
| ACCOUNTS RECEIVABLE INFORMATION | | | 226 |
| A/R CONTACT NAME: | 272 | A/R CONTACT PHONE: | 274 |
| SHOW ORGANIZER INFORMATION | | | 228 |
| URL (Link): | 276 | GRAPHIC FILE NAME: | 278 |
| FLOOR PLAN FILE NAME: | 280 | | |

Add 282

BACK — 164

LOGOUT — 180

THE EXPO GROUP
SERVICES | ACCOUNTS | FREIGHT | REPORTS

Add Service

372 —

| SHOW NAME | SHOW CODE | DIVISION | USER ID |
|---|---|---|---|
| Ace Hardware '99 Fall Conv | 910002 | GNL CNTG | gcrandy |

| SERVICE INFORMATION |||||
|---|---|---|---|---|
| SERVICE CODE: | 04  380 | SERVICE: | Cleaning Service | 382 |
| ACCOUNTING CODE 1: | 3180  384 | ACCOUNTING CODE 2: | 3562 | 386 |
| 374  ADDITIONAL TAXES |||||
| DESCRIPTION: 388 ||| PERCENTAGE: | 390 |
|  ||  ||
|  ||  ||
| 376  SERVICE CHARGE |||||
| PERCENT: 392 | MINIMUM: 394 | OR | AMOUNT: 396 ||
| 398 ☐ APPLY SALES TAX TO SERVICE CHARGE |||||
| NOTE (displayed when ordered): |||||
| 400 |||||

402 — Add

Figure 10

BACK 164
LOGOUT 180

460

THE EXPO GROUP
SERVICES | ACCOUNTS | FREIGHT | REPORTS

Add Supplier

| SHOW NAME | SHOW CODE | DIVISION | USER ID |
|---|---|---|---|
| PBX 2000 | 902002 | GNL CNTG | knapp |

Service: Cleaning Service

| SUPPLIER INFORMATION | | | 464 |
|---|---|---|---|
| SUPPLIER NAME: | 470 | FINAL INVOICE: | 0    472 |
| TAX RATE: | 474 | MARKUP: | 476 |
| LINE ITEM INFORMATION | | | 466 |
| RATE TYPE: | Adv Rt Thru Shw - Dis ▼  478 | FLOOR START DATE: | 480 |
| EXHIBITOR ADVANCE DISCOUNT: | 482 | EXHIBITOR FLOOR DISCOUNT: | 484 |
| ORGANIZER ADVANCE DISCOUNT: | 486 | ORGANIZER FLOOR DISCOUNT: | 488 |
| CANCELLATION INFORMATION | | | 468 |
| CANCELLATION DATE: | 490 | CANCELLATION PERCENT: | 492 |

Add 494

Figure 13

BACK 164

LOGOUT 180

THE EXPO GROUP
SERVICES | ACCOUNTS | FREIGHT | REPORTS

550

Add Item

| ITEM INFORMATION | | | | 554 |
|---|---|---|---|---|
| ITEM CODE: | 570 | OPTIONS CODE: | None 572 | |
| DESCRIPTION: | 574 | | | |
| SUGGESTED PRICE: | 576 | IMAGE FILE NAME: | 578 | |
| ☑ EXHIBITOR PRICING | | | | 556 |
| ADVANCE / PRESHOW | 580 | FLOOR / ON-SITE | | 582 |
| REGULAR RATE: | 584 | REGULAR RATE: | | 602 |
| DISCOUNTED RATE: | $0.00   586 | DISCOUNTED RATE: | $0.00 | 604 |
| MARKED UP RATE: | $0.00   588 | MARKED UP RATE: | $0.00 | 606 |
| PRESHOW PRICE: | $0.00   590 | PUBLISHED PRICE: | | 608 |
| PROFIT: | $0.00   592 | PROFIT: | $0.00 | 610 |
| PERCENTAGE: | 0.00%   594 | PERCENTAGE: | 0.00% | 612 |
| | Calculate   600 | | | |
| ☐ ORGANIZER PRICING | | | | 558 |
| ADVANCE / PRESHOW | 620 | FLOOR / ON-SITE | | 622 |
| REGULAR RATE: | 624 | REGULAR RATE: | | 636 |
| DISCOUNTED RATE: | $0.00   626 | DISCOUNTED RATE: | $0.00 | 638 |
| MARKED UP RATE: | $0.00   628 | MARKED UP RATE: | $0.00 | 640 |
| PRESHOW PRICE: | $0.00   630 | PUBLISHED PRICE: | 642 | |
| PROFIT: | $0.00   632 | PROFIT: | $0.00 | 644 |
| PERCENTAGE: | 0.00%   634 | PERCENTAGE: | 0.00% | 646 |
| ITEM SETTINGS | | | | 560 |
| UNIT OF MEASURE: | Each   650 | ☐ 652 LABOR? | LABOR TYPE? IN-ST | 654 |
| COMPANY CANCEL DATE: | 656 | COMPANY CANCEL PERCENT: | 658 | |
| ☐ 660 SALES TAX? | ☐ 662 ADDITIONAL TAX 1? | ☐ 664 ADDITIONAL TAX 2? | ☐ 670 PREPAID ITEM | |
| ☐ 672 OUT OF STOCK? | ☐ 674 PLACEMENT? | ☐ 676 REQUIRED COMMENT? | | |
| SPECIALIZED PROMPT: | 678 | | | |

Add   680

Figure 16

Add Supplier Payment

| SHOW NAME | SHOW CODE | DIVISION | USER ID |
|---|---|---|---|
| PBX 2000 | 902002 | GNL CNTG | gcrandy |

Service: Shipping Services   Supplier: Yellow Freight

| SUPPLIER INFORMATION | | 772 |
|---|---|---|
| PAYMENT DATE: | | 774 |
| PAYMENT TYPE: | Check ▼ 776 | |
| REFERENCE #: | | 778 |
| AMOUNT: | | 780 |

782 — Add Payment

- BACK 164
- ADD ACCOUNT 804
- EDIT ACCOUNT 806
- DELETE ACCOUNT 808
- ACCOUNT SUMMARY 810
- ACCOUNTING 812
- GLOBAL NOTE 814
- LOGOUT 180

800

THE EXPO GROUP
SERVICES | ACCOUNTS | FREIGHT | REPORTS

Accounts

| SHOW NAME | SHOW CODE | DIVISION | USER ID |
|---|---|---|---|
| Test Fibre Test | 987654 | GNL CNTG | knapp |

802

| BOOTH NUMBER FILTER: 822 | Apply one or both FILTERS 826 | ACCOUNT NAME FILTER 824 | | | | |
|---|---|---|---|---|---|---|
| SELECT | BOOTH NUMBER sort 830 | ACCOUNT NAME sort 832 | Account Type | Credit Card? | Terms &Con? | Ship Data? |
| O | NONE ASSIGNED | Eclipse | Third Party | NO | YES | NO |
| O | 108 | M. C Trading | Exhibitor | YES | YES | NO |
| O | 110 | Digital Optics | Exhibitor | YES | YES | NO |
| O | 111 | Another Test - Mike | A-0.5 Exh | YES | YES | YES |
| O | 111 | Wild West Tech | Exhibitor | YES | YES | NO |
| O | 112 | Optical Illusions | Exhibitor | YES | YES | NO |
| O | 114 | Oakland Cables | Exhibitor | YES | YES | NO |
| O | 116 | Fort Worth Fibre | Exhibitor | YES | YES | NO |
| O | 118 | Dallas Technology | Exhibitor | YES | YES | NO |
| O | 121 | Dickey's | Exhibitor | YES | YES | NO |
| O | 204 | J&J Exhibits | Exhibitor | YES | YES | NO |
| O | 206 | Isometric | Exhibitor | YES | YES | NO |
| O | 207 | Bank One | Exhibitor | YES | YES | NO |
| O | 208 | Max Miller | Exhibitor | YES | YES | NO |
| O | 208 | Max Miller | Exhibitor | NO | NO | NO |
| O | 209 | Cable Track | Exhibitor | NO | NO | NO |
| O | 210 | Kang's Cafe | Exhibitor | YES | YES | NO |
| O | 211 | Inter-Tel | Exhibitor | YES | YES | NO |
| O | 215 | Base Cabinet | Exhibitor | YES | YES | NO |
| O | 217 | AIWA | Exhibitor | YES | YES | NO |
| O | 219 | Microsoft | Exhibitor | YES | YES | NO |
| O | 220 | Boston Market | Exhibitor | YES | YES | NO |

Figure 20

BACK — 164
LOGOUT — 180

850

THE EXPO GROUP
SERVICES | ACCOUNTS | FREIGHT | REPORTS

Add Account

| SHOW NAME | SHOW CODE | DIVISION | USER ID |
|---|---|---|---|
| Metalcon 2 | 555 | GNL CNTG | gcrandy |

| ACCOUNT INFORMATION | | | 852 |
|---|---|---|---|
| ACCOUNT NAME: | 860 | JOB NUMBER: | 555    862 |
| ACCOUNT TYPE: | A-0.5 Exh  ▼  864 | EXHIBITOR TYPE: | --  ▼  866 |
| 870    872    STATUS FLAGS    874    876 | | | 854 |
| ☐ CREDIT CARD? | ☐ TERMS AND CONDITIONS? | ☐ SHIPPING DATA? | ☐ TAX EXEMPT? |
| DEFAULT ADDRESS, PHONE AND FAX | | | 856 |
| ADDRESS 1: | 878 | CITY: | 878 |
| ADDRESS 2: | 878 | STATE: | --  ▼  878 |
| COUNTRY: | --  ▼  878 | ZIP CODE: | 878 |
| PHONE NUMBER: | 880 | FAX NUMBER: | 882 |
| BOOTH SIGN | | | 858 |
| SIGN COPY: | 884 | | |
| CITY, STATE, COUNTRY: | 886 | | |

888 — [Add]   [Add Go to Booth] — 890

Figure 22

BACK — 164   THEEXPOGROUP   1050
LOGOUT — 180   SERVICES | ACCOUNTS | FREIGHT | REPORTS

Item Details

| SHOW NAME | SHOW CODE | DIVISION | USER ID |
|---|---|---|---|
| PBX 2000 | 902002 | GNL CNTG | gcrandy |

Account: Test Account - Account Summary
Booth Number: 300

| ORDER INFORMATION 1052 |||| 
|---|---|---|---|
| RECEIVED DATE: | 09/27/1999 | BOOTH DIMENSIONS: | 10' X 20' |
| TYPE: | Pre-Show | ORDER SUB TOTAL: | $0.00 |
| CARPET 1062 — 1066 ||||
| ITEM: | 005 - 100% nylon pile custom carpet - rental  1064 | OPTIONS: | Black |
| QUANTITY: | 1068 | PRICE: $3.25 | UNIT OF MEASURE: Sq Ft 1072 |
| COMMENT: | 1074 | 1070 ||
| NOTE: | Carpeteng is required by all exhibitors. 1076 |||

Save — 1080

Figure 28a

THE EXPO GROUP
SERVICES | ACCOUNTS | FREIGHT | REPORTS

1050

Item Details

| SHOW NAME | SHOW CODE | DIVISION | USER ID |
|---|---|---|---|
| PBX 2000 | 902002 | GNL CNTG | gcrandy |

Account: Test Account - Account Summary
Booth Number: 300

| ORDER INFORMATION | | | 1052 |
|---|---|---|---|
| RECEIVED DATE: | 09/27/1999 | BOOTH DIMENSIONS: | 10' X 20' |
| TYPE: | Pre-Show | ORDER SUB TOTAL: | $0.00 |
| Booth Security 1062 | | | |
| ITEM: | 005 - Booth Security Sun 2/7 eve. 1064 | | |
| PRICE: | $30.00  1070 | UNIT OF MEASURE: | ManHour  1072 |
| SELECT APPROXIMATE START AND END DATE/TIME  1082 | | | |
| START DATE/TIME: | 8/20/99 11:00 PM ▼ 1084 | END DATE/TIME: | 8/20/99 11:00 PM ▼ |
| NUMBER OF LABORERS: | 1088 | TOTAL MAN HOURS: | 1090       1086 Calculated |
| COMMENT: | 1074 | | |
| NOTE: | 1076 | | |

Save  1080

Figure 28b

THE EXPO GROUP
SERVICES | ACCOUNTS | FREIGHT | REPORTS

1050

Item Details

| SHOW NAME | SHOW CODE | DIVISION | USER ID |
|---|---|---|---|
| PBX 2000 | 902002 | GNL CNTG | gcrandy |

Account: Test Account - Account Summary
Booth Number: 300

| ORDER INFORMATION | | | 1052 |
|---|---|---|---|
| RECEIVED DATE: | 09/27/1999 | BOOTH DIMENSIONS: | 10' X 20' |
| TYPE: | Pre-Show | ORDER SUB TOTAL: | $0.00 |
| Modular Rental Exhibits | | | 1062 |
| ITEM | 005 - 10'X10' Stright Backwall Display-Turnkey  1064 | OPTIONS: 1066 | Hardwall - Black |
| QUANTITY: | 1068 | PRICE: $1,795.00    1070 | UNIT OF MEASURE: Each   1072 |
| ENTER YOUR SIGN HEADER COPY: | 1094 | | |
| NOTE: | There will be a 25% additional charge per week for all orders submitted after September 27, 1999.  1076 | | |
| SELECT YOUR OPTIONS FOR THE INCLUDED ITEMS | | | 1096 |
| DESCRIPTION | OPTIONS | QTY | UOM |
| 8X10 Carpet  1098 | Blue  1100 | 1  1102 | Each  1104 |
| One Time Cleaning Only | None  1100 | 100  1102 | Sq Ft  1104 |

1098

Save  1080

Figure 28c

THE EXPO GROUP
SERVICES | ACCOUNTS | FREIGHT | REPORTS

Item Details

| SHOW NAME | SHOW CODE | DIVISION | USER ID |
|---|---|---|---|
| PBX 2000 | 902002 | GNL CNTG | gcrandy |

Account: Test Account - Account Summary
Booth Number: 300

| ORDER INFORMATION | | | 1052 |
|---|---|---|---|
| RECEIVED DATE: | 09/27/1999 | BOOTH DIMENSIONS: | 10' X 20' |
| TYPE: | Pre-Show | ORDER SUB TOTAL: | $0.00 |
| Electrical Service | | | 1062 |
| ITEM | 005 - 110 Volt - 20 Amps  1064 | OPTIONS: 1066 | None |
| QUANTITY: | 1068 | PRICE: $80.00  1070 | UNIT OF MEASURE: Each  1072 |
| COMMENT: | 1074 | | |
| NOTE: | 1076 | | |
| SELECT THE PLACEMENT FOR THIS ITEM | | | 1110 |
| STANDARD PLACEMENT 1112 | | | |
| CUSTOM PLACEMENT 1114 | FEET UP | 5 | 1116 |
| | FEET OVER | 5 | 1118 |
| | UP | EXAMPLE  OVER | |

Save  1080

Figure 28d

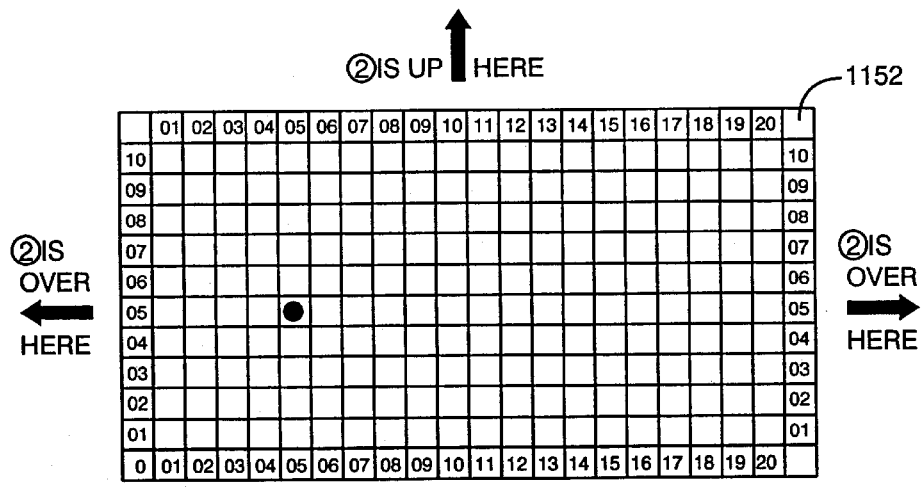
Figure 29

BACK  164
LOGOUT  180

1200

THE EXPO GROUP
SERVICES | ACCOUNTS | FREIGHT | REPORTS

Order Confirmation

| SHOW NAME | SHOW CODE | DIVISION | USER ID |
|---|---|---|---|
| PBX 2000 | 902002 | GNL CNTG | gcrandy |

Account: Test Account - Account Summary

1002

| ORDER INFORMATION ||||||||||
|---|---|---|---|---|---|---|---|---|---|
| RECEIVED DATE: 09/27/1999 ||| BOOTH: 300 (10' X 20') ||| TYPE: Pre-Show || ORDER TOTAL: $28.55 ||
| ITEMS ||||||||||
| ITEM NO | SERVICE | ITEM | OPTIONS | UNIT | QTY | PRICE | EXTENDED | DISCOUNT | TAX | TOTAL |
| 1 | Exhibitor Service Manuals | Exhibitor Service Manual | | Each | 1 | $30.00 | $30.00 | $3.00 | $1.55 | $28.55 |

Post Order  1204

Cancel  1206

BACK — 164

LOGOUT — 180

THE EXPO GROUP
SERVICES | ACCOUNTS | FREIGHT | REPORTS

Trouble Ticket

| SHOW NAME | SHOW CODE | DIVISION | USER ID |
|---|---|---|---|
| PBX 2000 | 902002 | GNL CNTG | gcrandy |

901

| Account | Booth(s) | Status |
|---|---|---|
| Test Account - Account Summary | 200, 300, 400 | Open |
| Outstanding Balance | | Chargeable Balance |
| $2,369.77 | | $2,369.77 |

SELECT TROUBLE TICKET TYPE

Service Trouble — 1254

Missing Freight — 1256

Figure 34

BACK —164

LOGOUT —180

THE EXPO GROUP
SERVICES | ACCOUNTS | FREIGHT | REPORTS

Adjustment

| SHOW NAME | SHOW CODE | DIVISION | USER ID |
|---|---|---|---|
| PBX 2000 | 902002 | GNL CNTG | gcrandy |

—901

| Account | Booth(s) | Status |
|---|---|---|
| Test Account - Account Summary | 200, 300, 400 | Open |
| Outstanding Balance | Chargeable Balance ||
| $2,369.77 | $2,369.77 ||

—1324

| CREDIT INFORMATION ||
|---|---|
| SERVICE TYPE  1326<br>00 Exhibitor Service Manuals ▼ | 1328  ADJUSTMENT AMT: |
| COMMENTS: ||
| 1330 ||

Save
—1332

Figure 36

BACK — 164
FEE — 1356
REFUND — 1358
REVERSED PAYMENT — 1360
LOGOUT — 180

1350

THE EXPO GROUP
SERVICES | ACCOUNTS | FREIGHT | REPORTS

Accounting

| SHOW NAME | SHOW CODE | DIVISION | USER ID |
|---|---|---|---|
| PBX 2000 | 902002 | GNL CNTG | gcrandy |

901

| Account | Booth(s) | Status |
|---|---|---|
| Test Account - Account Summary | 200, 300, 400 | Open |
| Outstanding Balance | | Chargeable Balance |
| $2,369.77 | | $2,369.77 |

1354
1362

| EVENT FILTER | All Acct Events ▼ | | | | | |
|---|---|---|---|---|---|---|
| DATE | EVENT | BOOTH | USER | RE. NUM | EST. CHRG | ACT. CHRG | ACT. PYMT |
| 09/22/1999 01:31:47 PM | Fee | | gcrandy | | | $10.00 | |
| 09/22/1999 01:32:02 PM | Refund | | gcrandy | | | | $10.00 |
| 09/22/1999 01:32:23 PM | ReversedPmt | | gcrandy | | | $30.00 | |

Figure 38

BACK — 164
ADD FREIGHT — 1384
EDIT FREIGHT — 1386
DELETE FREIGHT — 1388
FREIGHT CHARGES — 1390
LOGOUT — 180

1380

THE EXPO GROUP
SERVICES | ACCOUNTS | FREIGHT | REPORTS

Freight

| SHOW NAME | SHOW CODE | DIVISION | USER ID |
|---|---|---|---|
| PBX 2000 | 902002 | GNL CNTG | knapp |

100 Freight Tickets >> — 1382

| RECEIVER FILTER: | ACCOUNT NAME FILTER: | TRAILER # FILTER: |
|---|---|---|
| 1394 | 1396 | 1398 |

Apply FILTERS — 1400

| SELECT | RECEIVER NUMBER | ACCT NAME sort 1404 | DATE REC'D sort 1406 | TRAILER | STATUS |
|---|---|---|---|---|---|
| ○ |  | Active Voice | 02/08/1999 10:00:00 AM | 569 | Delivered |
| ○ |  | Active Voice | 02/08/1999 10:00:00 AM |  | Delivered |
| ○ | 014866 | Artisoft | 02/07/1999 08:00:00 AM |  | Delivered |
| ○ | 523766 | Aspect | 02/07/1999 08:45:00 AM | 569 | Delivered |
| ○ | 525024 | Aspect | 02/03/1999 06:45:00 AM |  | Received |
| ○ |  | Aspect | 02/03/1999 10:00:00 AM |  | Delivered |
| ○ |  | Bellcore | 02/06/1999 06:47:00 AM |  | Delivered |
| ○ |  | Bellcore | 02/06/1999 06:50:00 AM |  | Delivered |
| ○ |  | Bellcore | 02/03/1999 08:00:00 AM |  | Delivered |
| ○ |  | Bellcore | 02/06/1999 06:50:00 AM |  | Delivered |
| ○ | 614820 | Bellcore | 02/03/1999 01:30:00 AM |  | Delivered |
| ○ | 014821 | Switchview | 02/06/1999 06:45:00 AM |  | Received |
| ○ | 038321 | Switchview | 02/08/1999 10:50:00 AM |  | Delivered |
| ○ | 041770 | Tadiran Telecommunications, Inc. | 02/07/1999 02:15:00 AM |  | Waiting |
| ○ | 038319 | Vertical Network | 02/07/1999 09:25:00 AM |  | Delivered |

100 Freight Tickets >> — 1410
Update Status and Trailer — 1412

Figure 39

THE EXPO GROUP
SERVICES | ACCOUNTS | FREIGHT | REPORTS

Speedy Checkout

1520

| SHOW NAME | SHOW CODE | DIVISION | USER ID |
|---|---|---|---|
| Test Fibre Test | 987654 | GNL CNTG | knapp |

1522

| ACCOUNT NAME | BALANCE |
|---|---|
| Bank One | $1,869.42 |
| Base Cabinet | $2,859.42 |
| Bio-Homogenic | $2,041.99 |
| Cable Track | $2,679.42 |
| Cleveland Tech | $3,065.66 |
| Cowboy Optics | $4,235.21 |
| Dallas Technology | $2,690.92 |
| Digital Optics | $3,073.33 |
| E-Trade | $2,875.47 |
| ET | $2,164.23 |
| Excel | $2,312.66 |
| Fort Worth Fibre | $3,500.92 |
| Harware Hackers | $2,200.03 |
| Inspiro-Bio Inc. | $2,151.79 |
| Inter-Tel | $2,342.39 |
| Isometric | $1,894.45 |
| J&J Exhibits | $1,165.45 |
| Kang's Cafe | $1,313.75 |
| La Buena | $2,875.47 |
| Max Miller | $1,165.45 |
| Microsoft | $2,017.72 |
| Mr. Tom Landry | $2,875.47 |
| Oakland Cables | $1,003.32 |
| Office Max | $2,695.47 |
| Plano Software | $2,312.66 |
| Quality Tours | $2,036.66 |
| Seattle Sensors | $2,174.66 |
| The Expo Group | $276.00 |
| The Expo Group | $244.61 |
| TXU | $2,200.03 |
| Venice | $2,200.03 |
| Wild West Tech | $1,975.45 |
| Xedia | $2,875.47 |

1524 → ACCOUNT NAME column; 1526 → BALANCE column

| Process | 1528

Figure 43

BACK — 164
ADD BATCH — 1552
UNMATCHED PAYMENTS — 1554
SEARCH ACCOUNTS — 1556
LOGOUT — 180

1540

THE EXPO GROUP

Deposit Batch

1542

| << MONTH | 9/1999 | MONTH >> | |
|---|---|---|---|
| BATCH ID | DATE CHARGED | TOTAL | CLOSED? |
| 1003 | Thursday, September 09, 1999 | $3,000.01 | Yes |
| 1004 | Monday, September 20, 1999 | $43,269.90 | Yes |
| 1005 | Monday, September 20, 1999 | $12,142.64 | Yes |
| 1006 | Monday, September 20, 1999 | $495.89 | Yes |
| 1007 | Tuesday, September 21, 1999 | $0.00 | No |
| 1008 | Tuesday, September 21, 1999 | $2,255.99 | Yes |
| 1009 | Tuesday, September 21, 1999 | $5,329.09 | Yes |
| 1010 | Wednesday, September 22, 1999 | $3,244.32 | No |
| 1011 | Wednesday, September 22, 1999 | $3,244.41 | Yes |
| 1012 | Wednesday, September 22, 1999 | $1,073.38 | Yes |
| 1013 | Wednesday, September 22, 1999 | $190.42 | Yes |
| 1014 | Wednesday, September 22, 1999 | $1,325.99 | Yes |
| 1015 | Wednesday, September 22, 1999 | $7,929.26 | Yes |
| 1016 | Wednesday, September 22, 1999 | $70.00 | Yes |
| 1017 | Wednesday, September 22, 1999 | $3,095.28 | Yes |
| 1018 | Wednesday, September 22, 1999 | $62,654.05 | No |
| 1019 | Wednesday, September 22, 1999 | $1,494.08 | Yes |
| 1020 | Wednesday, September 22, 1999 | $2,861.27 | Yes |
| 1021 | Wednesday, September 22, 1999 | $2,005.52 | Yes |
| 1022 | Wednesday, September 22, 1999 | $4,367.87 | Yes |
| 1023 | Wednesday, September 22, 1999 | $3,868.35 | Yes |
| 1024 | Wednesday, September 22, 1999 | $2,401.80 | Yes |
| 1025 | Wednesday, September 22, 1999 | $336.09 | Yes |
| 1026 | Wednesday, September 22, 1999 | $1,718.00 | Yes |
| 1027 | Wednesday, September 22, 1999 | $3,032.20 | Yes |
| 1028 | Thursday, September 23, 1999 | $794.20 | Yes |
| 1029 | Friday, September 24, 1999 | $14,043.02 | No |

AUTOMATED CONVENTION PROCESSING SYSTEM AND METHOD

RELATED PATENT APPLICATION

This Application is a continuation of U.S. application Ser. No. 09/440,601 filed Nov. 15, 1999, now U.S. Pat. No. 6,557,007 by Randall J. Pekowski, April E. Hurley, Brian D. Kleinfall, and Michael S. Moorehead and entitled "AUTOMATED CONVENTION PROCESSING SYSTEM AND METHOD."

TECHNICAL FIELD OF THE INVENTION

This invention relates generally to the field of automated processing systems and more particularly to an automated convention processing system and method.

BACKGROUND OF THE INVENTION

Conventions are an important sales tool for many businesses. Conventions bring many different businesses together in one location where they can display examples of their products and/or services and speak with potential customers or clients. In order for a business to exhibit their products or services in a booth at a convention, the businesses must order a variety of services provided by many different suppliers. For example, a business may need to order a table, a carpet, a telephone, a facsimile machine, telephone service, and electrical service, to name a few. Traditionally, a business needing these services is required to identify companies which provide the services it requires in the vicinity of the convention facility, negotiate separately with each one regarding price, keep track of deliveries from each one, and receive separate invoices from and make separate payments to each one. This system of ordering services for a convention is extremely time consuming and inefficient.

In response to this inefficiency, The Expo Group[SM] has previously developed and used a convention processing system that allowed businesses to interact with a single company, The Expo Group[SM], to order all the services needed for their exhibits. This system provided the ability to order in one place a variety of services from many different suppliers for a convention exhibit. In addition, the system provided for including one item in each order, charging account balances one at a time, and assigning one booth to each account.

SUMMARY OF THE INVENTION

In accordance with the present invention, an automated convention processing system and method are provided that further advance the entry, processing and tracking of convention-related transactions. In particular, the present invention provides a system and method that allows exhibitors and other customers to order from a remote location many different services from many different suppliers while dealing with only one company.

In one embodiment of the present invention, a convention processing system is provided that includes a database operable to store show information identifying at least one show in which a plurality of exhibitors will exhibit their wares, service information identifying a plurality of services available to the exhibitors at the show, supplier information identifying at least one supplier for each service and a plurality of suppliers for at least one service, and at least one item for each service, the item identifying a particular type of the service, a price for the item and a supplier for the item.

The system further includes a transaction engine operable to access the database. The transaction engine is also operable to display the services for the show, receive a selection of a service, display a list of items for the service, receive a selection of an item for an exhibitor, store the selection of the item as an order, add the price for the item to a balance for the exhibitor, and display an updated account summary for the exhibitor.

More specifically, in accordance with a particular embodiment of the present invention, the database is operable to store a discount date and a discount percent for each show. The discount percent is applied to the price of items ordered before the discount date. The database is also operable to store a control date for the show. The control date specifies a date before which an estimated quantity of items to be ordered is estimated and after which an actual quantity of items is ordered. The database is also operable to store an amount of a first estimated payment for a first estimated quantity of items. The first estimated payment is received from a first exhibitor prior to the control date and the discount date. The database is also operable to store an amount of a second estimated payment for a second estimated quantity of items. The second estimated payment is received from a second exhibitor prior to the control date and after the discount date. The transaction engine is operable to determine a first actual price after the control date based on the discount percent and the actual quantity of items ordered by the first exhibitor and to credit a difference between the amount of the first estimated payment and the first actual price to the first exhibitor's balance. The transaction engine is also operable to determine a second actual price after the control date based on the actual quantity of items ordered by the second exhibitor and to credit a difference between the amount of the second estimated payment and the second actual price to the second exhibitor's balance.

In accordance with another particular embodiment of the present invention, the database is operable to store a placement grid for a booth in which an exhibitor will exhibit his wares. The placement grid is a graphic representation of the booth. The transaction engine is operable to receive a selection of an item for a specified booth for the exhibitor. The transaction engine is also operable to display for at least a subset of the items the placement grid for the specified booth. The transaction engine is also operable to receive a selection of a location on the placement grid for the item.

In accordance with yet another particular embodiment of the present invention, the database is operable to store a plurality of customer types, the customer types including an exhibitor and an organizer. The database is also operable to store an exhibitor cost that includes an advanced exhibitor cost and a floor exhibitor cost for each item and an organizer cost that includes an advanced organizer cost and a floor organizer cost for each item. The database is also operable to store a floor date for the show. The transaction engine is operable to receive an order for an item from a customer. The transaction engine is also operable to select either the exhibitor cost or the organizer cost for the item based on the customer type. For the exhibitor cost, the transaction engine is operable to select either the advanced exhibitor cost or the floor exhibitor cost to add to the supplier's balance based on a comparison of the floor date to an order date. For the organizer cost, the transaction engine is operable to select either the advanced organizer cost or the floor organizer cost to add to the supplier's balance based on a comparison of the floor date to an order date.

In accordance with yet another particular embodiment of the present invention, the database is operable to store a base amount for each show and credit card information for a plurality of exhibitors. The transaction engine is operable to compare the exhibitor's balance for each of the plurality of exhibitors to the base amount and to automatically charge the credit cards for each exhibitor with a balance greater than the base amount.

In accordance with another aspect of the present invention, a method is provided for receiving an order from an exhibitor at a computer terminal remote from a convention processing system that stores services for a show at which a plurality of exhibitors will exhibit their wares and that stores at least one item for each service. According to the method a list of services for the show is displayed. A selection of a service is received. A list of items for the service is displayed. A selection of an item is received. The selection of the item is transmitted as an order to the convention processing system. An automatically generated updated account summary including the order is received from the convention processing system. The updated account summary is displayed.

Technical advantages of the present invention include providing an improved convention processing system and method. In particular, a convention processing system includes information regarding many different services from many different suppliers that are needed for a convention exhibit. Customers work with a single company to order these services and, thus, receive one invoice for many different services. As a result, ordering and paying for services is more efficient and easier to accomplish for the customers.

In addition, the system allows users of the convention processing system to order services for the convention remotely, such as over the Internet. Thus, both customers and employees of the company providing the convention processing system may access information, place orders, make payments, and the like, from any Internet-connected computer at any time of the day or night.

Other technical advantages of the present invention include providing tracking capabilities, allowing user customization, providing improved item-related functions, providing improved price-related functions and providing greater flexibility. For example, tracking capabilities include the ability to track payments to suppliers and the ability for both customers and employees to track freight. User customization is provided in that customers are able to choose the placement of certain items within their booths and are able to request times for labor to be performed. Improved item-related functions include the ability to order multiple items in a single order, to include multiple sub-items in a master item, to remove out of stock items from display for ordering, and to provide a specialized prompt for an item. Improved price-related functions include the ability to to calculate price margins, to track date-sensitive costs and selling prices, to apply multiple taxes to an item, to automatically post service charges to orders within a service, to provide two separate cancellation dates and percentages for each item, and to allow customers to pre-pay for estimated orders up until the control date and to receive a discount if the order is placed before the discount deadline date. Greater flexibility is also provided in that multiple accounts may be charged automatically, multiple booths may be assigned to a single account and multiple accounts to a single booth, booth assignments may be automatically changed, and a single note may be recorded to all accounts within a show.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIG. 6 is a screen diagram depicting one embodiment of an add show screen displayed to a user during the process of FIG. 5;

FIG. 10 is a screen diagram depicting one embodiment of an add service screen displayed to a user during the process of FIG. 9;

FIG. 13 is a screen diagram depicting one embodiment of an add supplier screen displayed to a user during the process of FIG. 12;

FIG. 16 is a screen diagram depicting one embodiment of an add item screen displayed to a user during the process of FIG. 15;

FIG. 20 is a screen diagram depicting one embodiment of a select accounts screen displayed to a user upon selection of the accounts function from the main menu screen of FIG. 7;

FIG. 22 is a screen diagram depicting one embodiment of an add account screen displayed to a user during the process of FIG. 21;

FIGS. 28A–D are screen diagrams depicting item detail screens for customizing orders for particular types of items and displayed to a user during the process of FIG. 24;

FIG. 29 is a screen diagram depicting one embodiment of an item placement screen which is displayed to a user during the process of FIG. 24;

FIG. 30 is a screen diagram depicting one embodiment of an order confirmation screen displayed to a user during the process of FIG. 24;

FIG. 34 is a screen diagram depicting one embodiment of a trouble ticket screen displayed to a user during the process of FIG. 33;

FIG. 36 is a screen diagram depicting one embodiment of an adjustment screen displayed to a user during the process of FIG. 35;

FIG. 38 is a screen diagram depicting one embodiment of an accounting screen displayed to a user during the process of FIG. 37;

FIG. 39 is a screen diagram depicting one embodiment of a select freight screen displayed to a user upon selection of the freight function from the main menu screen of FIG. 7;

FIG. 43 is a screen diagram depicting one embodiment of a speedy checkout screen displayed to a user during the process of FIG. 42;

FIG. 44 is a screen diagram depicting one embodiment of a deposit batch screen displayed to a user upon selection of a show and the daily deposits function from the select show screen of FIG. 4;

DETAILED DESCRIPTION OF THE INVENTION

Figure 1:
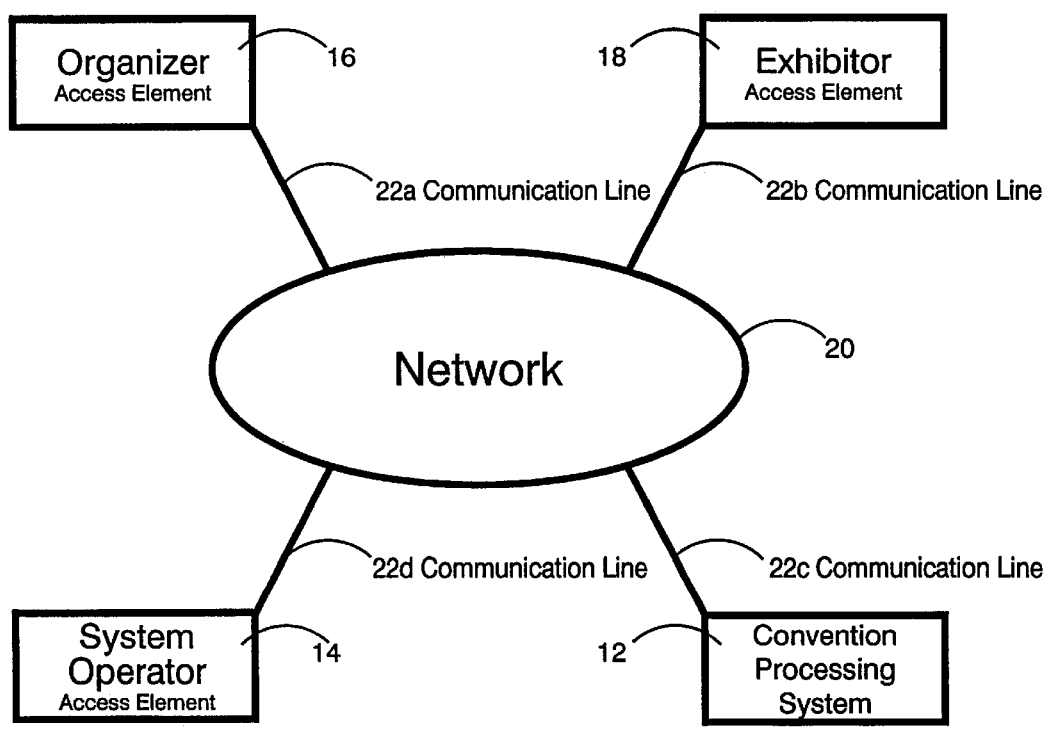
FIG. 1 is a block diagram illustrating a convention processing network in accordance with one embodiment of the present invention.

FIG. 1 is a block diagram illustrating a convention processing network 10 which comprises a convention processing system (CPS) 12 and a plurality of access elements: a system operator access element 14, an organizer access element 16 and an exhibitor access element 18. The CPS 12 is coupled to the access elements 14, 16 and 18 through a network 20. The network 20, which allows the CPS 12 and the access elements 14, 16 and 18 to communicate with each other, may comprise a plurality of communication lines 22.

The CPS 12 may be provided and maintained by a convention processing company. The access elements 14, 16 and 18 allow different types of users to access the CPS 12 through the network 20. Employees of the convention processing company, known as system operators, access the CPS 12 through the network 20 with the system operator access element 14. Customers of the convention processing company, such as convention organizers and convention exhibitors, access the CPS 12 through the network 20 with the organizer access element 16 and the exhibitor access element 18. The access elements 14, 16 and 18 are each a personal computer terminal or other device capable of communicating with the CPS 12 over the network 20.

When system operators access the CPS 12, for example, the CPS 12 identifies the system operator with a user name, identification number and/or password and allows the system operator to perform a number of different functions. These functions may include setting up a new convention, or show, placing an order for a customer, recording a payment made by a customer, tracking freight, adding a new supplier of services or a new service, canceling an order and the like. On the other hand, customers accessing the CPS 12 may be allowed to perform more limited functions on the CPS 12, such as placing an order, tracking their freight, viewing important dates for a show at which they are exhibiting wares, viewing a floor plan of the show and the like.

In one embodiment, the network 20 may comprise dial access via a telephone link. In this embodiment, the CPS 12 and the access elements 14, 16 and 18 may be remote from each other and located anywhere in the world. In one embodiment, the CPS 12 and the access elements 14, 16 and 18 may connect and communicate with each other via modems and analog or digital communication lines. Moreover, the network 20 may be any interconnection found on any computer network such as a local area network (LAN), a wide area network, the Internet, or any other communications and data exchange systems created by connecting two or more computers. The network 20 may also comprise any suitable combination of networks, such as the Internet and a LAN. For example, the system operator access element 14 may be able to access the CPS 12 over the Internet or over a LAN, while the organizer access element 16 and the exhibitor access element 18 may be able to access the CPS 12 only over the Internet.

In an exemplary embodiment, the network 20 comprises the Internet. The Internet is a world-wide network that allows users to access vast amounts of stored information and to communicate with other Internet-connected computers. The Internet supports various protocols for information transfer. The World Wide Web (the "web") is one of the most popular Internet information transfer protocols. Web-accessible information is identified by a Uniform Resource Locator ("URL") which specifies the location of information on the Internet in terms of a specific computer and a location on that computer of a file having the information. In the Internet embodiment, the CPS 12 provides a web-site that makes information and programming stored at the CPS 12 available to the access elements 14, 16 and 18. The access elements 14, 16 and 18 access the CPS files and functionality with the proper communication protocol and the URL of the web-site. As described in more detail below, the information made available by the web-site is broken down into a number of web pages, which comprise formatted, tree-structured information. The information on the web pages may comprise text, images, sounds, animations and other information.

The communication lines 22 connecting the CPS 12 and the access elements 14, 16 and 18 to the network 20 may be any type of communication link capable of supporting data transfer. Both the Internet and other types of networks are typically formed using wire-based networks. Wire-based networks generally use cabling, such as coaxial cable or fiber optic cable, as communication lines 22 to connect computers in the network. However, networks may be formed by means other than cabling. In one embodiment, the communication lines 22 may comprise, alone or in combination, Integrated Services Digital Network, Asymmetric Digital Subscriber Line, T1 or T3 communication lines, wireless communication links, hard-wire lines, telephone links or other suitable types of data communication links. The communication lines 22 may also connect to a plurality of intermediate servers between the network 20 and the CPS 12 and between the network 20 and the access elements 14, 16 and 18.

Figure 2:
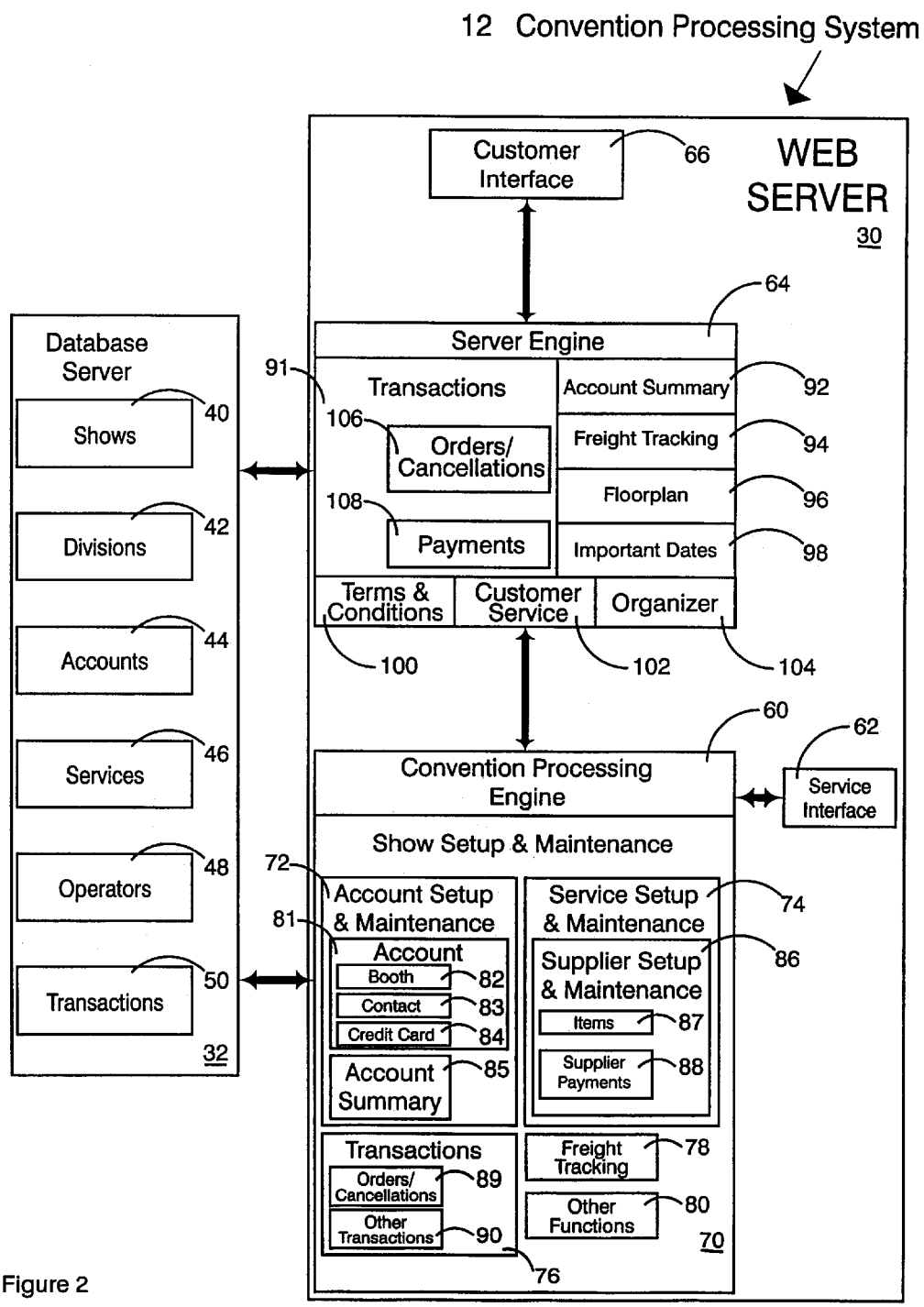
FIG. 2 is a block diagram illustrating one embodiment of the convention processing system (CPS) of FIG. 1.

FIG. 2 is a block diagram illustrating one embodiment of the convention processing system 12 of FIG. 1. In the exemplary embodiment, the network 20 over which the CPS 12 communicates with the access elements 14, 16 and 18 comprises the Internet. The CPS 12 comprises a web server 30 for providing the functionality of the CPS 12 and a database server 32 for storing data for the CPS 12. According to one embodiment, the web server 30 comprises a Microsoft Windows Internet Information Server 4.0™ on a Microsoft Windows NT 4.0™ operating system, and the database server 32 comprises a Structured Query Language Server 6.5 on a Microsoft Windows NT 4.0™ operating system and a Microsoft Access 97™ database. The CPS 12 may also include a fax server, e-mail server, and any other suitable server. It will be understood that other suitable hardware and software may be used in connection with the present invention.

The database server 32 comprises a plurality of sections storing data. The sections may include, among others, a show section 40, a division section 42, an account section 44, a service section 46, an operator section 48 and a transactions section 50. In accordance with one embodiment, the information stored in the database server 32 may be organized in a hierarchy with shows at the top, followed by divisions in each show, followed by services and accounts in each division. Services may be further subdivided into one or more suppliers for each service, and suppliers may be divided into one or more items for each supplier. However, it will be understood, that any other organization of the information which associates items with services may be implemented without departing from the scope of the present invention. For example, services could be divided into one or more items while items could be divided into one or more suppliers.

Each section of the database server 32 may comprise, for example, tables, charts, lists or other groupings of data stored in any suitable memory. It will be understood that data of the CPS 12 may be otherwise suitably segregated for storage and/or stored on distributed systems that together form the database server 32.

The show section 40 includes information regarding one or more shows, such as show identification numbers, show dates and show locations. The division section 42 includes information about divisions within each show, such as other organizer information and other exhibitor information used by other divisions within the company. Thus, data may be stored independently for divisions within the same show. The account section 44 includes information relating to a plurality of accounts within each show, such as booth assignments, billing names, credit card numbers, and the like. The service section 46 includes information relating to a plurality of services provided by a plurality of suppliers that are available to organizers and exhibitors at a show. The operator section 48 includes identifying information for each system operator, such as login names and passwords. The transactions section 50 includes information regarding available transactions, such as placing orders, making payments, tracking freight and the like, as well as records associated with each of these transactions.

The web server 30 comprises a convention processing engine 60 that may be accessed by system operators through a service interface 62, which communicates with the system operator access element 14 over the network 20. The web server 30 also comprises a server engine 64 that may be accessed by customers through a customer interface 66, which communicates with the organizer access element 14 and the exhibitor access element 18 over the network 20. The convention processing engine 60 and the server engine 64 may communicate with each other, as well as with the database server 32. According to one embodiment, the service interface 62 and the customer interface 66 both comprise Internet Explorer 4.0™, and the web server 30 communicates with the database server 32 through Microsoft's OLE DB™.

The convention processing engine 60 comprises a plurality of function sections that provide functions to system operators through the service interface 62. The function sections include a show set-up and maintenance section 70 which comprises a plurality of sub-function sections. The sub-function sections include an account set-up and maintenance section 72, a service set-up and maintenance section 74, a transactions section 76, a freight tracking section 78 and an other functions section 80.

The account section 72, which provides account functions and account summaries, comprises an account section 81, which includes booth information 82, contact information 83 and credit card information 84, and an account summary section 85. The service section 74, which provides supplier-related functions, comprises a supplier set-up and maintenance section 86 that includes an item section 87 and a supplier payment section 88. The transactions section 76, which comprises an order/cancellation section 89 and an other transactions section 90, provides functions such as placing orders, canceling orders, recording payments, adjusting balances, and the like. The freight tracking section 78 provides the ability to track freight from the point of receipt through delivery to the convention. The other functions section 80 provides a plurality of functions including report generation, invoice generation, speedy checkout, show alerts, and the like. Using these functions, a system operator can generate reports, generate invoices, easily charge a plurality of accounts for a particular show, and post alerts for a particular show, in addition to other functions.

The server engine 64 comprises a plurality of function sections that provide functions to organizers and exhibitors through the customer interface 66. These function sections include a transactions section 91, an account summary section 92, a freight tracking section 94, a floor plan section 96, an important dates section 98, a terms and conditions section 100, a customer service section 102 and an organizer section 104. The transactions section 91, which comprises an order/cancellation section 106 and a payment section 108, provides functions similar to those of the transactions section 76 in the convention processing engine 60. For example, functions included may be placing orders, canceling orders and making payments. The account summary section 92 provides customers with summaries of their accounts. The freight tracking section 94 allows customers to track freight from ordering through delivery. The floor plan section 96 allows customers to view a floor plan of the location in which the convention will be held. The important dates section 98 allows customers to view a list of important dates for the convention. The terms and conditions section 100 allows customers to view terms and/or conditions relating to, for example, legal information, such as credit card security, privacy policies and copyright notices, ordering information, such as payment policies and cancellation policies, and service information for services such as air, water, electricity, telecommunications, and the like. The customer service section 102 provides customers with information regarding how and where to contact the convention processing company and/or one of its representatives, as well as other ordering methods. The organizer section 104 provides a link to the convention organizer's web-site for the benefit of exhibitors so that they may access additional information.

The function sections for the convention processing engine 62 and the server engine 64 will now be described. It will be understood that the function sections may be otherwise suitably implemented by the CPS 12 without departing from the scope of the present invention.

Figure 3:
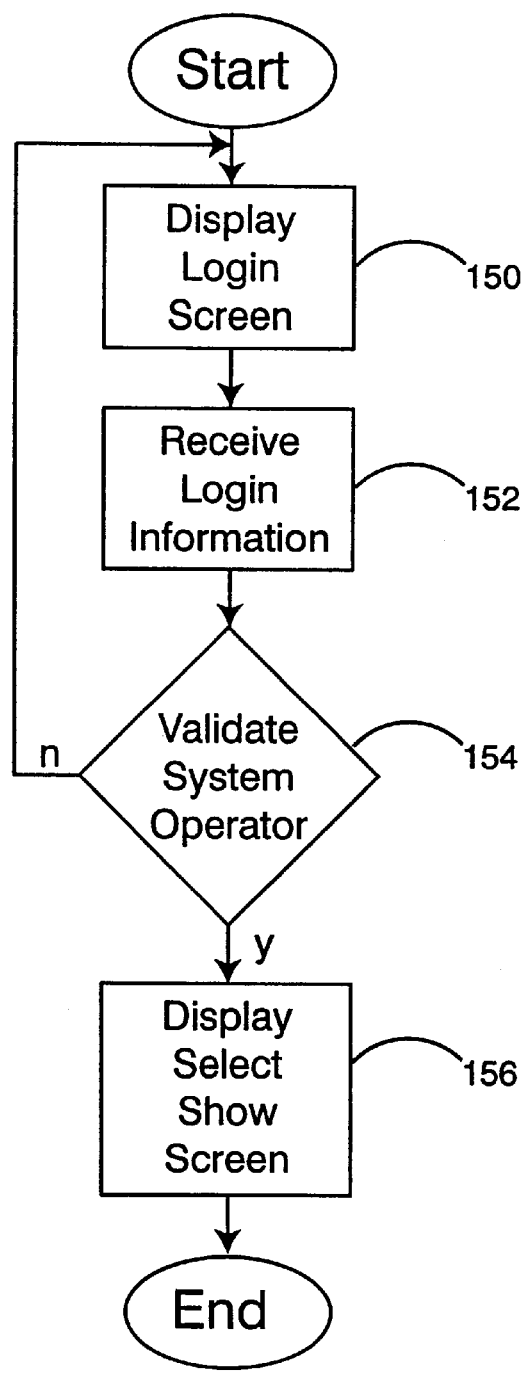
FIG. 3 is a flow diagram showing one embodiment of a process for logging into the CPS of FIG. 2.

FIG. 3 is a flow diagram showing one embodiment of a process for logging into the CPS 12. The method begins at step 150 where the CPS 12 displays a login screen in response to a system operator entering the appropriate URL into a web browser at the system operator access element 14. At step 152, the CPS 12 receives login information from the system operator. This information may include a name, an identification number, a password, or the like. At step 154, the CPS 12 attempts to validate the system operator by verifying the login information received at step 152. To accomplish this, the convention processing engine 60 accesses the operator section 48 of the database server 32 and searches for a match. If the system operator is validated in step 154, the method proceeds to step 156 where the CPS 12 displays a select show screen and the method comes to an end. However, if the system operator was not validated in step 154, the method returns to step 150 and again displays the login screen.

Figure 4:
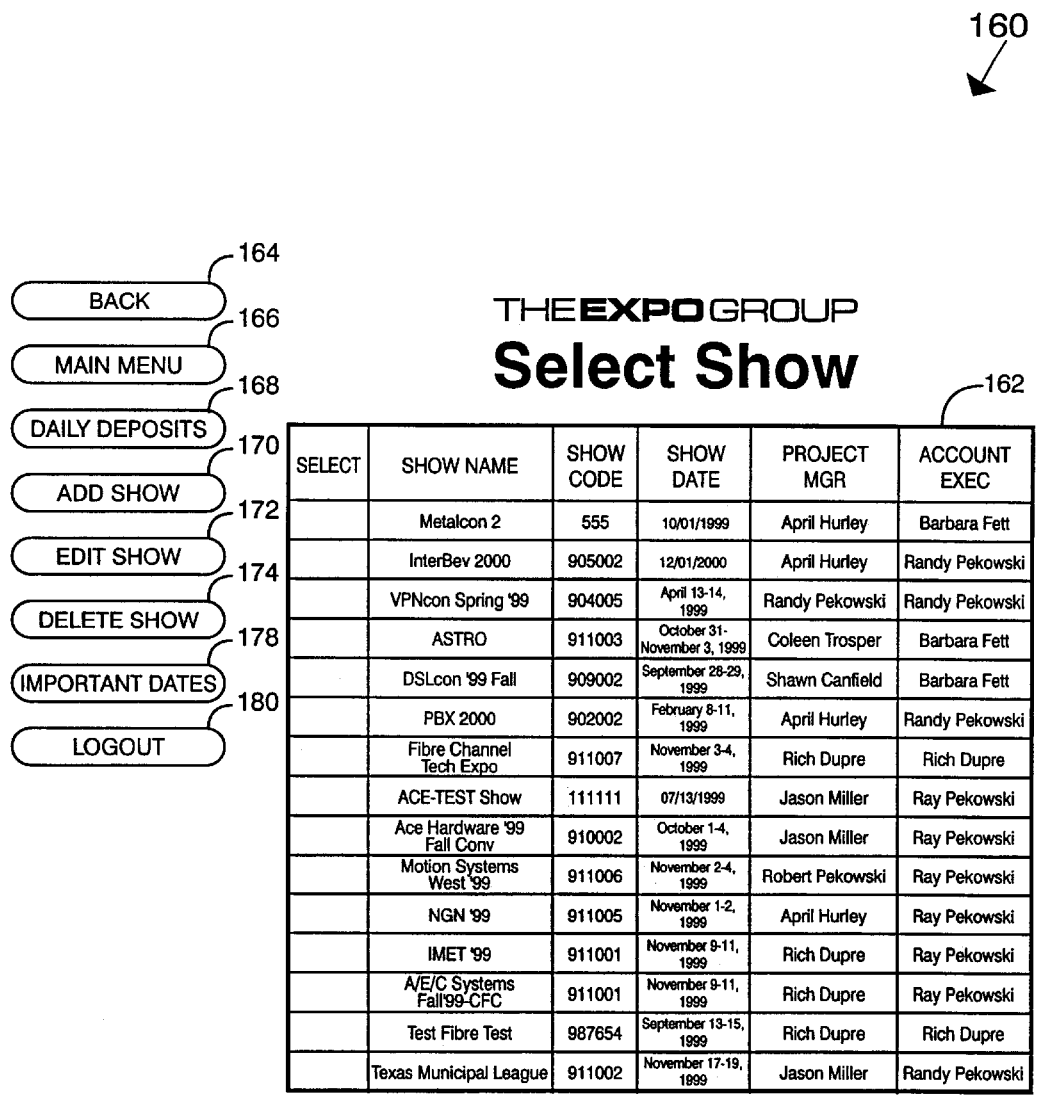
FIG. 4 is a screen diagram depicting one embodiment of a select show screen displayed to a user upon logging in to the CPS.

FIG. 4 is a screen diagram depicting one embodiment of a select show screen 160. The select show screen 160 includes a show table 162 and a plurality of buttons. The buttons include a back button 164 for returning to a previously displayed screen, a main menu button 166 for displaying a main menu, a daily deposits button 168 for accessing information regarding deposits, an add show button 170 for adding a new show to the show section 40 of the database server 32, an edit show button 172 for editing information relating to an existing show, a delete show button 174 for removing an existing show from the show section 40 of the database server 32, an important dates button 178 for displaying important dates related to a particular show, and a logout button 180 for logging out of the CPS 12. The back button 164 and the logout button 180 are universal buttons that are included in each of the screens described below.

The show table 162 includes summary information identifying all current shows. The summary information may include a show name, a show code, a show date, a project manager and an account executive. In order to select a particular show, the system operator clicks on an icon, such as a circle, that corresponds to the show to be accessed. After a show is selected, the system operator may then click on one of the buttons 166, 168, 170, 172, 174 or 178 to perform the desired function for the selected show.

Figure 5:
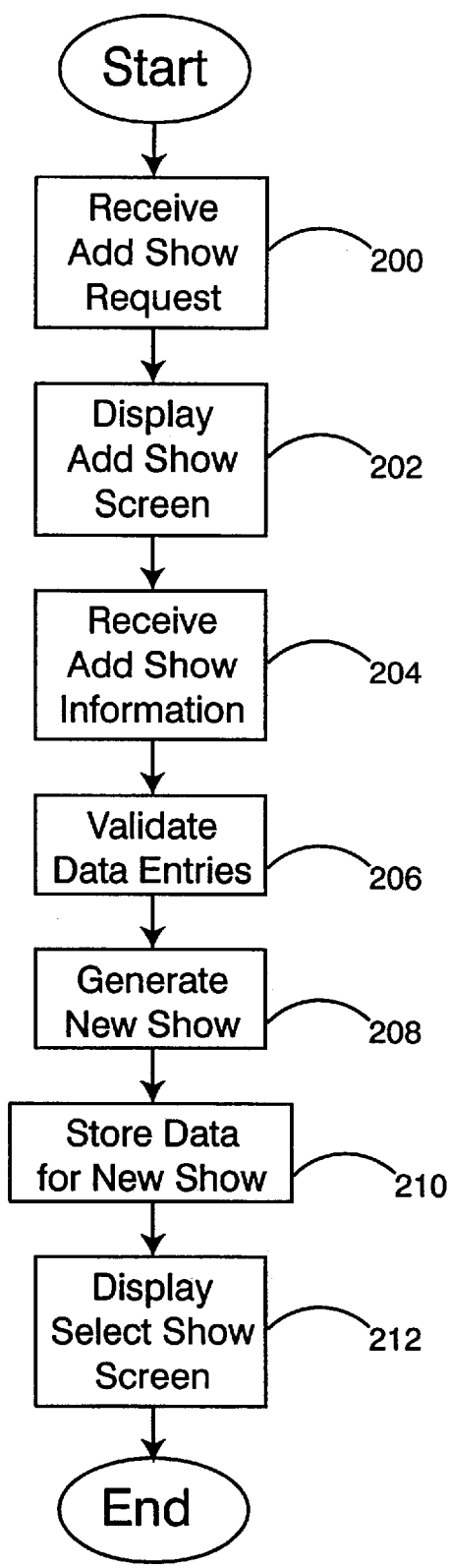
FIG. 5 is a flow diagram showing one embodiment of a process for adding a new show to the CPS.

FIG. 5 is a flow diagram showing one embodiment of a process for adding a new show to the CPS 12 through the show set-up and maintenance section 70 of the convention processing engine 60. As previously described, information for each show is stored in the show section 40 of the database server 32. The method begins at step 200 where the CPS 12 receives an add show request from the system operator. A system operator makes this request by clicking the add show button 170 on the select show screen 160. At step 202, the CPS 12 displays an add show screen to the system operator. The add show screen contains user entry fields for each item of information needed to set up a show. At step 204, the CPS 12 receives add show information from the system operator. After validating the data entries at step 206, the CPS 12 generates a new show at step 208. At step 210, the CPS 12 stores the data for the new show in the show section 40 of the database server 32. At step 212, the CPS 12 displays the select show screen 160, which includes a summary of the information relating to the new show, at which point the method ends.

FIG. 6 is a screen diagram depicting one embodiment of an add show screen 218. The add show screen 218 includes show information 220, system information 222, resource information 224, accounts receivable information 226 and show organizer information 228. The show information 220 includes a show ID number 230 that is assigned by the CPS 12. According to one embodiment, the show ID number 230 comprises a nine-digit number, including the four-digit year, the two-digit month and a three-digit sequential number that is reset to 000 at the beginning of each month. Other entry fields for show information 220, which are input by a system operator, include a show date 232, a show name 234, the name of the facility 236 at which the show will be held, and an address 238 for the facility including street address, city, state, country and zip codes. In accordance with one embodiment, the state and country information may be selected by the system operator through a drop down menu.

Entry fields for system information 222 include a default job number 250, a show sales tax 252, a control date 254, a discount deadline date 256, a base amount 258 and discount percent 260. The default job number 250 provides a default number for including in a customer's account. However, as described in more detail below, the default job number 250 may be changed when the account is added. This enables the CPS 12 to handle billing for different divisions within the same show. The control date 254 is a date that identifies how certain orders will be treated. For example, some services may be ordered with an estimated amount or quantity, as opposed to an actual quantity. The control date 254 specifies on which date the quantity pricing for those services is entered or posted in the CPS 12 to reflect actual quantity. The discount deadline date 256 is the date before which the convention processing company will provide a specified discount for services provided at the corresponding show. The base amount 258 is the maximum amount that will be written off when closing accounts for the corresponding show. The discount percent 260 specifies the discount that will be provided for services ordered before the discount deadline date 256.

One feature of the CPS 12 involves pre-payments for items with estimated quantities. For services with estimated quantities prior to the control date 254, a customer may pre-pay an estimated amount in order to receive the discount that is available by ordering before the discount deadline date 256. At any time after the control date 254, when the actual quantity for the service is known, the customer's balance may be calculated by multiplying the actual quantity by the discount price. Any remaining amount from the pre-paid estimate may then be used to pay for other services or may be refunded to the customer. Also, although no discount is given, a customer may pre-pay an estimated amount after the discount deadline date up until the control date.

Entry fields for resource information 224 include a project manager 262 and account executive 264, which may be selected from drop down menus of certain employees of the convention processing company. The resource information 224 also includes a show owner 270, who is the person with complete authority regarding the data in the CPS 12 for this show.

Entry fields for accounts receivable information 226 include a name 272 and phone number 274 for a contact within the convention processing company. This name 272 and phone number 274 may be printed on customers invoices.

Entry fields for show organizer information 228 include a URL link 276 which is the URL for the organizer's web-site that is used to setup a link for the customers, as described in more detail below. Entry fields for show organizer information 228 also include a graphic file name 278 and a floor plan file name 280. The graphic file name 278 identifies the name of a graphic, such as a logo, for the organizer of the show. This graphic is displayed for customers accessing the CPS 12 through the customer interface 66. The floor plan file name 280 identifies the name of a floor plan graphic of the facility at which the show will be held. The floor plan graphic may comprise a CAD drawing stored in the database server 32. As described in more detail below, this floor plan may be viewed by customers.

The add show screen 218 also comprises an add button 282. Once a system operator has completed all of the required information on the add show screen 218, the system operator clicks the add button 282 to send the information over the network 20 to the CPS 12. After clicking the add button 282, the system operator is provided with the select show screen 160 from the CPS 12. At this point, the select show screen 160 includes a summary of the information identifying the new show that has just been added by the system operator.

Figure 7:
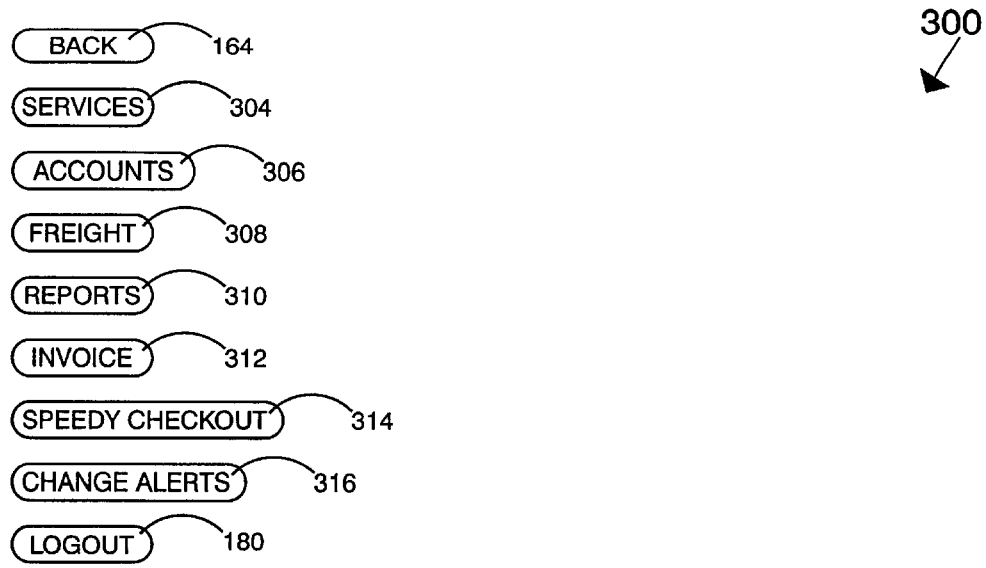
FIG. 7 is a screen diagram depicting one embodiment of a main menu screen displayed to a user upon selection of a show and the main menu function from the select show screen of FIG. 4.

FIG. 7 is a screen diagram depicting one embodiment of a main menu screen 300 for a show. The main menu screen 300 is displayed in response to a system operator clicking the main menu button 166 on the select show screen 160 after selecting a show. The main menu screen 300 includes show alerts 302 and a plurality of buttons. The buttons, which allow a system operator to perform a plurality of functions for the selected show, include the back button 164, a services button 304 for accessing the service setup and maintenance functions 74, an accounts button 306 for accessing the account setup and maintenance section 72, a freight button 308 for accessing the freight tracking section 78, a reports button 310 for generating reports, an invoice button 312 for generating invoices, a speedy checkout button 314 for charging certain accounts automatically, a change alerts button 316 for editing the show alerts 302, and the logout button 180. The main menu screen 300 is displayed in response to a system operator clicking the main menu button 166 on the select show screen 160, after selecting a particular show from the show table 162.

Figure 8:
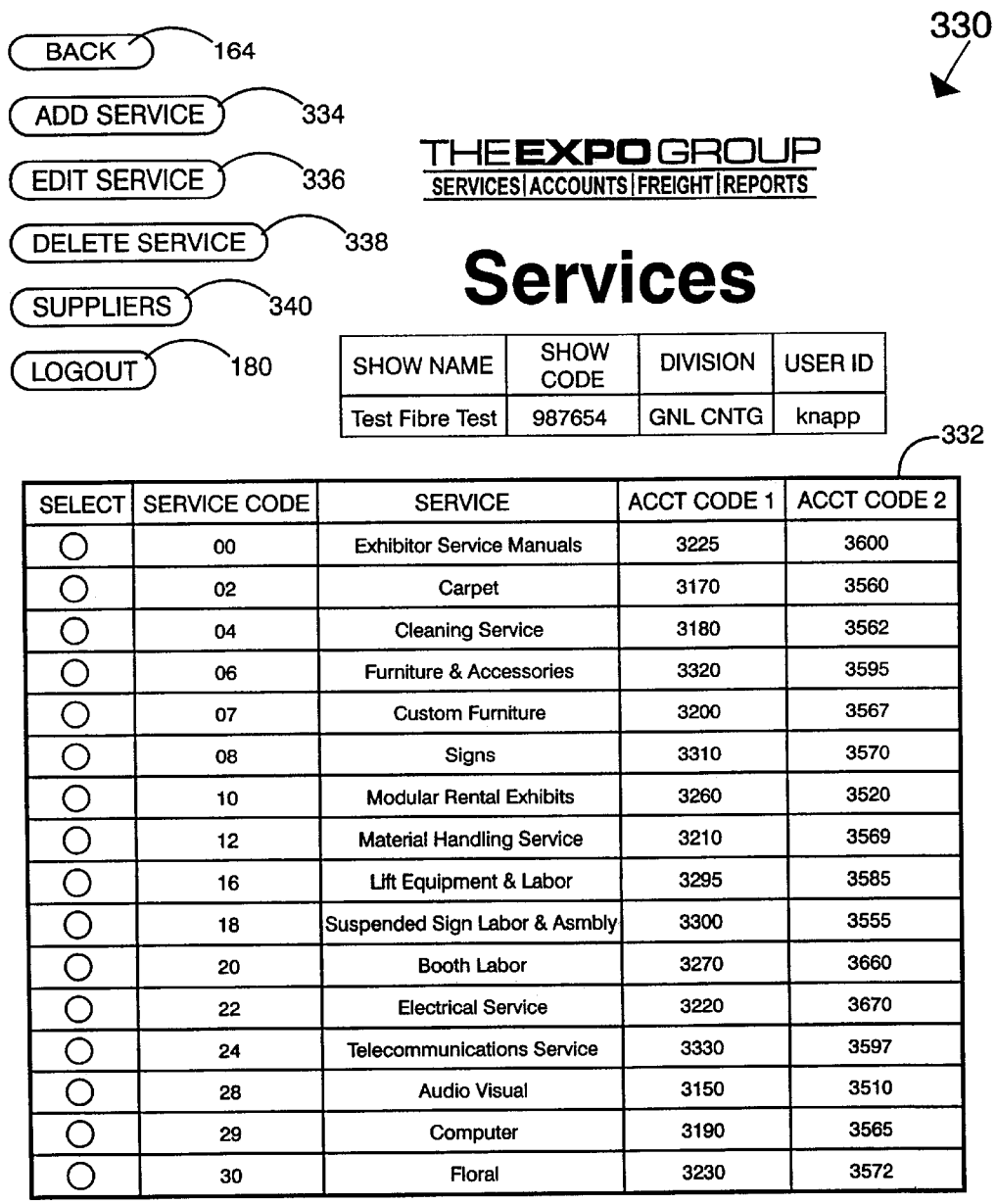
FIG. 8 is a screen diagram depicting one embodiment of a select services screen displayed to a user upon selection of the services function from the main menu screen of FIG. 7.

FIG. 8 is a screen diagram depicting one embodiment of a select services screen 330. The select services screen 330 is displayed in response to a system operator clicking the services button 304 on the main menu screen 300 for a particular show. Services are labor, products, materials, and other services each provided by one or more suppliers to customers at a show. Each means every one of at least a subset of identified items.

The select services screen 330 includes a service table 332 and a plurality of buttons. The buttons include the back button 164, an add service button 334 for adding a new service to the service section 46 of the database server 32, an edit service button 336 for editing information relating to an existing service, a delete service button 338 for removing an existing service from the service section 46 of the database server 32, a suppliers button 34 for accessing the suppliers setup and maintenance section 86, and the logout button 180.

The service table 332 includes summary information identifying all services provided for the show, such as a service code, a service name, a first accounting code and a second accounting code. In order to select a particular service, the system operator clicks on a circle that corresponds to the service to be accessed. After a service is selected, the system operator may then click on one of the buttons 334, 336, 338 or 340 to perform the desired function for the selected service.

Figure 9:
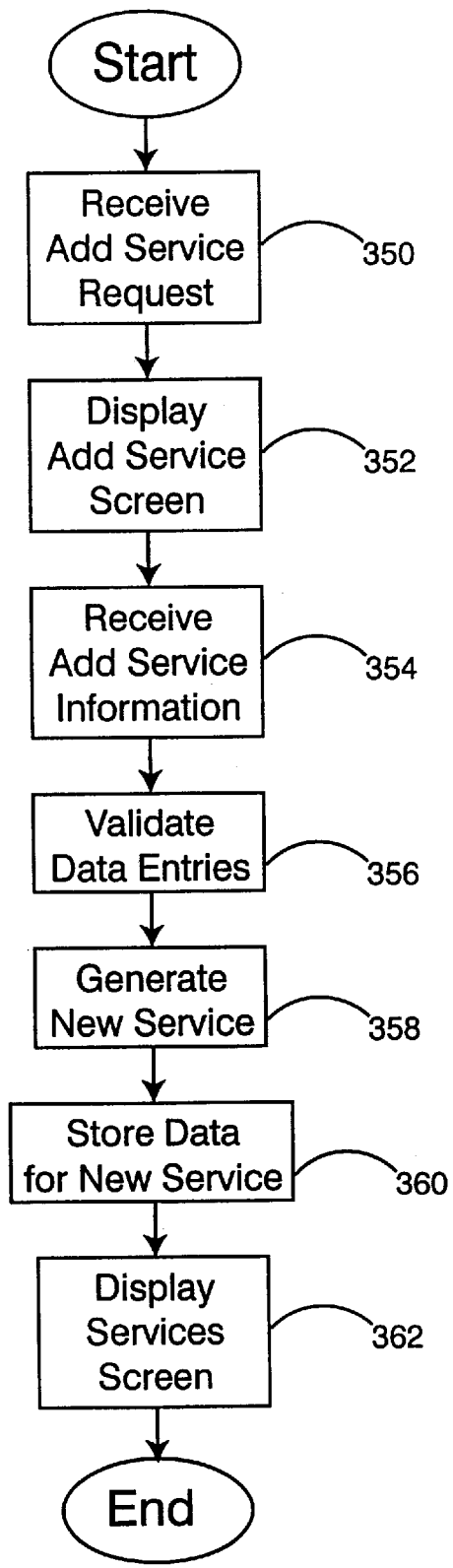
FIG. 9 is a flow diagram showing one embodiment of a process for adding a new service to the CPS.

FIG. 9 is a flow diagram showing one embodiment of a process for adding a new service to the CPS 12 through the service setup and maintenance section 74 of the convention processing engine 60. As previously described, server information is stored in the service section 46 of the database server 32.

The method begins at step 350 where the CPS 12 receives an add service request from the system operator. A system operator makes this request by clicking the add service button 334 on the select services screen 330. At step 351, the CPS 12 displays a master services screen from which the system operator may select a service. In one embodiment, the master services are stored in the service section 46 of the database server 32 and may be modified only by a system administrator. After the system operator has selected a service to add from the master list of available services, the CPS 12 at step 352 displays an add service screen to the system operator. The add service screen includes user entry fields for each item of information needed to set up a service for a show. At step 354, the CPS 12 receives add service information from the system operator. After validating the data entries at step 356, the CPS 12 generates a new service at step 358. At step 360, the CPS12 stores the data for the new service in the service section 46 of the database server 32. At step 362, the CPS 12 displays the select services screen 330, which includes a summary of the information relating to the new service, at which point the method ends.

FIG. 10 is a screen diagram depicting one embodiment of an add service screen 370. The add service screen 370 includes service information 372, additional taxes information 374 and service charge information 376. Entry fields for service information 372 include a service code 380 which is a number identifying the service, a service name 382 which is a description of the service, an exhibitor accounting code 384 and an organizer accounting code 386. The separate accounting codes 384 and 386 allow services to be tracked separately for exhibitors and organizers. Entry fields for additional taxes information 374 include a description 388 and a percentage 390. In the embodiment shown, two additional taxes may be included for the new service by providing a description 388 of the tax and a numerical percentage 390 for the tax. For example, the additional taxes information 374 may include a usage tax, an excise tax, a city tax, a county tax, and the like. Entry fields for service charge information 376 include a percent 392, a minimum 394 and an amount 396. A service charge may be applied to a service for payment to the convention processing company by including the appropriate information in the service charge information 376. In the embodiment shown, the service charge may be either a percentage of the service price with a minimum amount or a flat rate. For a percentage with a minimum, the percent 392 includes the percentage of the service price to be used and the minimum 394 includes the minimum dollar amount to be charged. The amount included in the minimum 394 is charged when the percentage of the service price is lower than the minimum amount. For a flat rate, the amount to be charged is included in the amount 396.

The add service screen 370 also includes a sales tax box 398. If this box 398 is marked by the system operator, a sales tax will be applied to the service charge. If the box 398 is not marked, no sales tax will be applied to the service charge. The add service screen 370 also includes a note field 400. This note field 400 can store a textual message that will be displayed when a customer orders this service. Finally, the add service screen 370 includes an add button 402. Once a system operator has completed all of the required information on the add service screen 370, the system operator clicks the add button 402 to send the information over the network 20 to the CPS 12. After clicking the add button 402, the system operator is provided with the select services screen 330 from the CPS 12. At this point, the select services screen 330 includes a summary of the information identifying the new service that has just been added by the system operator.

Figure 11:
FIG. 11 is a screen diagram depicting one embodiment of a select suppliers screen displayed to a user upon selection of a service and the suppliers function from the select services screen of FIG. 8.

FIG. 11 is a screen diagram depicting one embodiment of a select suppliers screen 420. The select suppliers screen 420 is displayed in response to a system operator selecting a service and clicking the suppliers button 340 on the select services screen 330. For the embodiment described, suppliers are a subset of services such that each service includes at least one supplier but may include any number of suppliers. The select suppliers screen 420 includes a supplier table 422 and a plurality of buttons. The buttons include the back button 164, an add supplier button 424 for adding a new supplier to the service section 46 of the database server 32, an edit supplier button 426 for editing information relating to an existing supplier, a delete supplier button 428 for removing an existing supplier from the service section 46 of the database server 32, an items button 430 for accessing the items section 87 for a supplier, a payments button 432 for accessing the supplier payments section 88, and the logout button 180.

The supplier table 422 includes summary information for all existing suppliers for a service. The summary information includes supplier name, agreement type, total due, and total payments. In order to select a particular supplier, the system operator clicks on a circle that corresponds to the supplier to be accessed. After a supplier is selected, the system operator may then click on one of the buttons 424, 426, 428, 430 or 432 to perform the desired function for the selected supplier.

Figure 12:
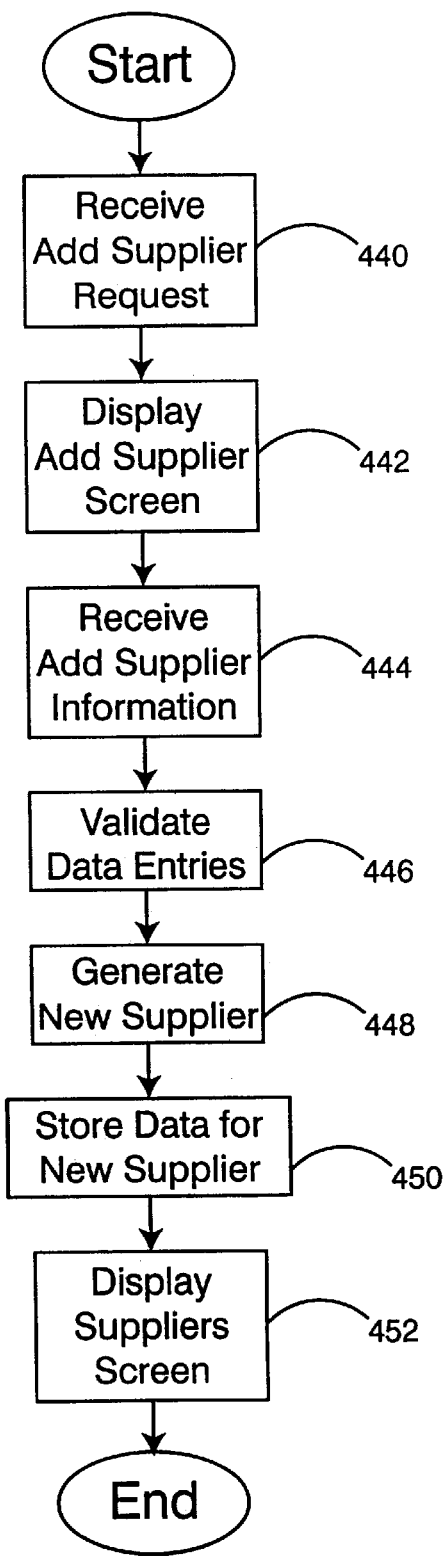
FIG. 12 is a flow diagram showing one embodiment of a process for adding a new supplier to the CPS.

FIG. 12 is a flow diagram showing one embodiment of a process for adding a new supplier to the CPS 12 through the suppliers setup and maintenance section 86 of the convention processing engine 60. As previously described, the supplier information is stored in the service section 46 of the database server 32. The method begins at step 440 where the CPS 12 receives an add supplier request from the system operator. A system operator makes this request by selecting a service and clicking the add supplier button 424 on the select suppliers screen 420. At step 442, the CPS 12 displays an add supplier screen to the system operator. The add supplier screen includes user entry fields for each item of information needed to set up a supplier for a service. At step 444, the CPS 12 receives add supplier information from the system operator. After validating the data entries at step 446, the CPS 12 generates a new supplier at step 448. At step 450, the CPS 12 stores the data for the new supplier in the service section 46 of the database server 32. At step 452, the CPS 12 displays the select suppliers screen 420, which includes a summary of the information relating to the new supplier, at which point the methods ends.

FIG. 13 is a screen diagram depicting one embodiment of an add supplier screen 460. The add supplier screen 460 includes supplier information 464, line item information 466 and cancellation information 468. Entry fields for supplier information 464 include a supplier name 470, a final invoice 472 which is the amount of the final invoice received from the supplier, a tax rate 474 which is a supplier-specific tax that is charged for services provided by the supplier and is paid directly to the supplier, and a company markup 476 which is a markup percentage for the convention processing company from the supplier's price to the customer's price. In a particular embodiment, the company markup 476 is included only as a guideline and does not actually affect pricing.

Entry fields for line item information 466 include a rate type 478 which may be selected from a drop-down menu. The rate type 478 may comprise, for example, advance rate with discount, advance rate without discount, or time-limited advance rate. Entry fields for line item information 466 also include a floor start date 480 which is a date that may be used to provide discounts for items ordered before that date. Entry fields for line item information 466 also include an exhibitor advance discount 482, and an exhibitor floor discount 484, an organizer advance discount 486 and an organizer floor discount 488. The exhibitor discounts 482 and 484 are discounts given to the convention processing company for exhibitors by the supplier, while the organizer discounts 486 and 488 are discounts given to the convention processing company for organizers by the supplier. The advance discounts 482 and 486 are discounts for orders placed before the floor start date 480. The floor discounts 484 and 488 are discounts available after the floor start date 480.

Entry fields for cancellation information 468 include a cancellation date 490 and a cancellation percent 492. When an order is canceled before the cancellation date 490, the entire price of the canceled item is refunded by the supplier. However, after the cancellation date 490, the cancellation percent 492 determines what portion of the price of the canceled item will not be refunded.

The add supplier screen 460 also includes an add button 494. Once a system operator has completed all of the required information on the add supplier screen 460, the system operator clicks the add button 494 to send the information over the network 20 to the CPS 12. After clicking the add button 494, the system operator is provided with the select suppliers screen 420 from the CPS 12. At this point, the select suppliers screen 420 includes a summary of the information identifying the new supplier that has just been added by the system operator.

Figure 14:
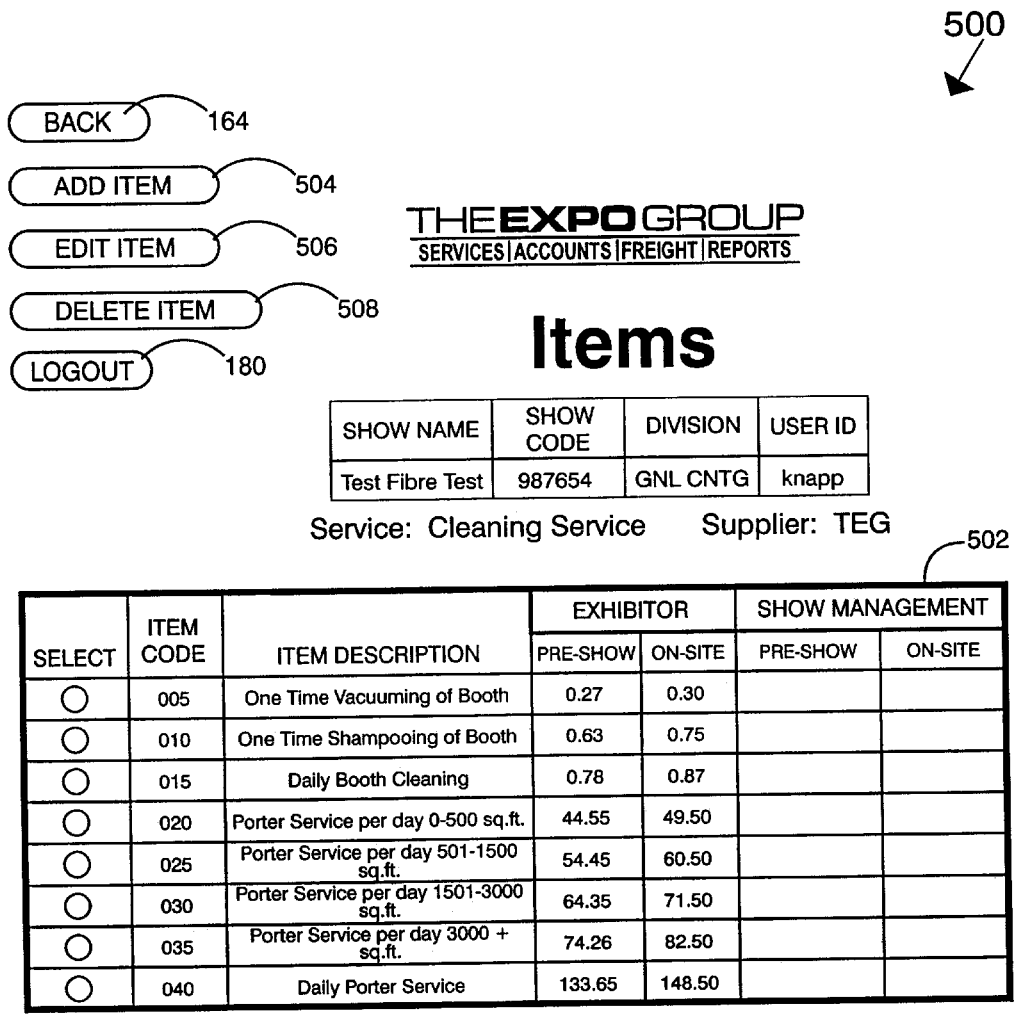
FIG. 14 is a screen diagram depicting one embodiment of an item screen displayed to a user upon selection of a supplier and the items function from the select suppliers screen of FIG. 11.

FIG. 14 is a screen diagram depicting one embodiment of a select item screen 500. The select item screen 500 is displayed in response to a system operator selecting a supplier and clicking the item button 430 on the select suppliers screen 420. For the embodiment described, items are a subset of suppliers such that each supplier includes at least one item but may include any number of items. The select item screen 500 includes an item table 502 and a plurality of buttons. The buttons include the back button 164, an add item button 504 for adding a new item to the service section 46 of the database server 32, an edit item button 506 for editing information relating to an existing item, a delete item button 508 for removing an existing item from the service section 46 of the database server 32, and the logout button 180.

The item table 502 includes summary information for all existing items for a supplier. The summary information includes item code, item description, exhibitor pricing and organizer pricing. In order to select a particular item, the system operator clicks on a circle that corresponds to the item to be accessed. After an item is selected, the system operator may then click on one of the buttons 504, 506 or 508 to perform the desired function for the selected item.

Figure 15:
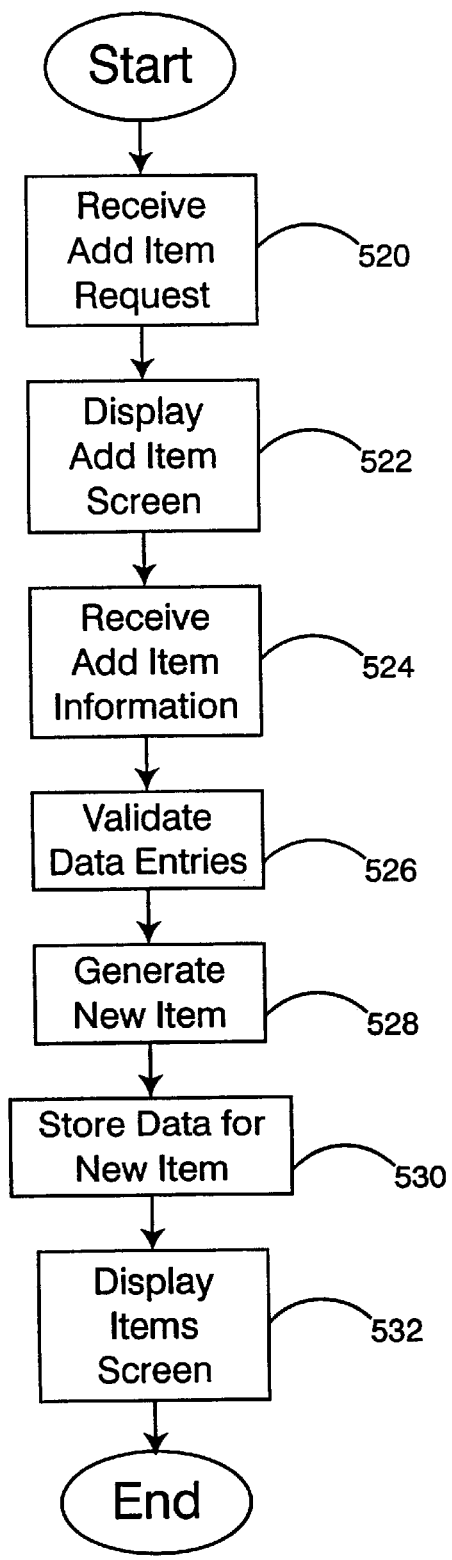
FIG. 15 is a flow diagram showing one embodiment of a process for adding a new item to the CPS.

FIG. 15 is a flow diagram showing one embodiment of a process for adding a new item to the CPS 12 through the items section 87 of the convention processing engine 60. As previously described, the item information is stored in the service section 46 of the database server 32. The method begins at step 520 where the CPS 12 receives an add item request from the system operator. A system operator makes this request by clicking the add item button 504 on the items screen 500. At step 522, the CPS 12 displays an add item screen to the system operator. The add item screen includes user entry fields for each item of information needed to set up an item for a supplier. At step 524, the CPS 12 receives add item information from the system operator. After validating the data entries at step 526, the CPS 12 generates a new item at step 528. At step 530, the CPS 12 stores the data for the new item in the service section of the database server 32. At step 532, the CPS 12 displays the items screen 500, which includes a summary of the information relating to the new item, at which point the method ends.

FIG. 16 is a screen diagram depicting one embodiment of an add item screen 550. The add item screen 550 includes item information 554, exhibitor pricing information 556, organizer pricing information 558, and item settings information 560. Entry fields for item information 554 include an item code 570 which is a number identifying the item and an option code 572 which may comprise a drop-down menu of options available for the item. If an option code 572 is selected, the customer will be given an opportunity to select from the options when ordering the item. Entry fields for item information 554 also include a description field 574 which can store a textual description of the item, a suggested price 576 which is the full price of the item without discounts, and an image file name 578 which may identify the name of a graphic stored in the database server 32 for display to the customer.

Entry fields for exhibitor pricing information 556 include advance pricing 580 and floor pricing 582. The advance pricing 580 includes a regular rate 584 which is the full cost of the item from the supplier for items ordered by the floor start date 480, a discounted rate 586 which is the negotiated cost of the item from the supplier as calculated by the CPS 12 by applying the exhibitor advance discount 482 to the regular rate 584, a marked up rate 588 which is the price of the item for exhibitors as calculated by the CPS 12 by applying the company markup 476 but which may be changed by a system operator, a pre-show price 590 which is a discount of a published price 608 based on the discount percent 260 as calculated by the CPS 12, a profit 592 which is the difference between the pre-show price 590 and the discounted rate 586 as calculated by the CPS 12, and a percentage 594 which is the ratio of the profit 592 to the pre-show price 590 as calculated by the CPS 12. The pre-show price 590, the profit 592 and the percentage 594 are calculated by the CPS 12 when the system operator clicks the calculate button 600.

The floor pricing 582 includes a regular rate 602 which is the full cost of the item from the supplier for items ordered after the floor start date 480, a discounted rate 604 which is the negotiated cost of the item from the supplier as calculated by the CPS 12 by applying the exhibitor floor discount 484 to the regular rate 602, a marked up rate 606 which is the price of the item for exhibitors as calculated by the CPS 12 by applying the company markup 476 but which may be changed by a system operator, a published price 608 which is the actual selling price for the item, a profit 610 which is the difference between the published price 608 and the discounted rate 604 as calculated by the CPS 12, and a percentage 612 which is the ratio of the profit 610 to the published price 608 calculated by the CPS 12. The profit 610 and the percentage 612 are calculated by the CPS 12 when the system operator clicks the calculate button 600.

Entry fields for organizer pricing information 558 include advance pricing 620 and floor pricing 622. The advance pricing 620 includes a regular rate 624 which is the full cost of the item from the supplier for items ordered by the floor start date 480, a discounted rate 626 which is the negotiated cost of the item from the supplier as calculated by the CPS 12 by applying the organizer advance discount 486 to the regular rate 624, a marked up rate 628 which is the price of the item for organizers as calculated by the CPS 12 by applying the company markup 476 but which may be changed by a system operator, a pre-show price 630 which is a discount of a published price 642 based on the discount percent 260 as calculated by the CPS 12, a profit 632 which is the difference between the pre-show price 630 and the discounted rate 626 as calculated by the CPS 12, and a percentage 634 which is the ratio of the profit 632 to the pre-show price 630 as calculated by the CPS 12. The pre-show price 630, the profit 632 and the percentage 634 are calculated by the CPS 12 when the system operator clicks the calculate button 600.

The floor pricing 622 includes a regular rate 636 which is the full cost of the item from the supplier for items ordered after the floor start date 480, a discounted rate 638 which is the negotiated cost of the item from the supplier as calculated by the CPS 12 by applying the organizer floor discount 488 to the regular rate 636, a marked up rate 640 which is the price of the item for organizers as calculated by the CPS 12 by applying the company markup 476 but which may be changed by a system operator, a published price 642 which is the actual selling price for the item, a profit 644 which is the difference between the published price 642 and the discounted rate 638 as calculated by the CPS 12, and a percentage 646 which is the ratio of the profit 644 to the published price 642 as calculated by the CPS 12. The profit 644 and the percentage 646 are calculated by the CPS 12 when the system operator clicks the calculate button 600.

Entry fields for item settings information 560 include a unit of measure 650 which may be selected from a drop-down menu comprising a plurality of units of measure such as CWT, each linear foot, man hours, square feet and the like. Entry fields for item settings information 560 also include a labor box 652 which may be marked by a system operator to indicate that the item requires labor by a worker and a labor type 654 which comprises a drop-down menu from which a system operator may select the corresponding labor type. Entry fields for item settings information 560 also include a company cancel date 656 and a company cancel percent 658. When an order is canceled before the company cancel date 656, the entire price of the canceled item is refunded by the convention processing company. However, after the company cancel date 656, the company cancel percent 658 determines what portion of the price of the canceled item will not be refunded. Thus, the CPS 12 provides for two separate cancellation dates and percentages: one date and percentage for the supplier, as described above in connection with FIG. 13, and one date and percentage for the convention processing company, as just described. This ensures that the convention processing company does not provide full refunds to customers for canceled items for which the supplier will not provide the convention processing company a full refund.

Entry fields for the item settings information 560 also includes a plurality of flags. These flags include a sales tax flag 660 for indicating that the item must have the sales tax 252 applied, an additional tax 1 flag 662 and an additional tax 2 flag 664 for indicating that the item must have one or both of the additional taxes 374 applied, a pre-paid item flag 670 for indicating that a customer may pre-pay for the item based on an estimated amount, an out of stock flag 672 for indicating that the item is out of stock and for removing the item from the list displayed to customers for ordering, a placement flag 674 for indicating that a customer may select the placement of the item in the booth, and a required comment flag 676 for indicating that a customer response is required to a specialized prompt 678 that is a textual message displayed when the item is ordered.

The add item screen 550 also comprises an add button 680. Once a system operator has completed all of the required information on the add item screen 550, the system operator clicks the add button 680 to send the information over the network 20 to the CPS 12. After clicking the add button 680, the system operator is provided with the items screen 500 from the CPS 12. At this point, the items screen 500 includes a summary of the information identifying the new item in the item table 502.

Now that services, suppliers, and items have been set up for a show, including costs, prices, taxes, and dates that affect prices, all transactions can be automatically posted to both supplier and customer accounts by the CPS 12.

Figure 17:
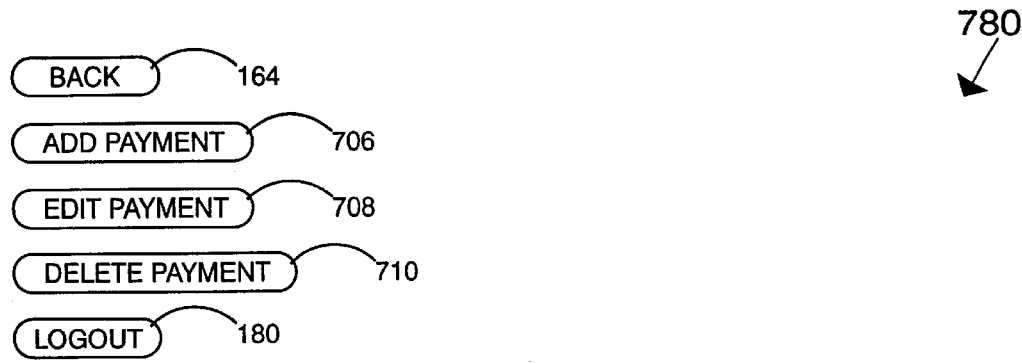
FIG. 17 is a screen diagram depicting one embodiment of a supplier payment screen displayed to a user upon selection of a supplier and the payments function from the select suppliers screen of FIG. 11.

FIG. 17 is a screen diagram depicting one embodiment of a supplier payment screen 700. The supplier payment screen 700 is displayed in response to a system operator selecting a supplier and clicking the payments button 432 on the select suppliers screen 420. The supplier payment screen 700 includes a supplier payments table 702, a supplier settlement summary 704, and a plurality of buttons. The buttons include the back button 164, an add payment button 706 for adding a new payment to the service section 46 of the database server 32, an edit payment button 708 for editing information relating to an existing payment, a delete payment button 710 for removing an existing payment from the service section 46 of the database server 32, and the logout button 180.

The supplier payment table 702 includes summary information for each outstanding payment. The summary information includes payment date, payment type, reference number and amount. In order to select a particular payment, the system operator clicks on a circle that corresponds to the payment to be accessed. After a payment is selected, the system operator may then click on one of the buttons 706, 708 or 710 to perform the desired function for the selected payment.

The supplier settlement summary 704 includes a total due 720 which is the amount due to the supplier. The total due 720 is automatically calculated by the CPS 12 using costs for orders and amounts of refunds for cancellations for items provided by the supplier. For example, a discounted rate 586, 604, 626 or 638 is included as a cost for each item ordered depending on whether the customer is an exhibitor or an organizer and depending on the date of the order. Orders received before the floor start date 480 include the discounted rate 586 for exhibitors and the discounted rate 626 for organizers, while orders received after the floor start date 480 receive the discounted rate 604 for exhibitors and the discounted rate 638 for organizers. Similarly, any items that have been canceled before the cancellation date 490 will allow the full cost to be removed from the supplier's balance, while items canceled after the cancellation date 490 will result in a reduced amount being removed from the supplier's balance, the reduced amount based on the cancellation percent 492. The supplier settlement summary 704 also includes an invoice amount 722 which is the amount of the final invoice sent to the convention processing company from the supplier and which is input into the add supplier screen 460 as the final invoice 472, a total payment 724 which is the sum of all payments made to the supplier as calculated by the CPS 12 based on previous supplier payments stored in the service section 46 of the database server 32 and summarized in a supplier payment table 702, a difference 726 which is the difference between the invoice amount 722 and the total payment 724, a due-to-company 728 which is any amount overpaid by the convention processing company, and a due-to-supplier 730 which is any amount underpaid by the convention processing company.

Figure 18:
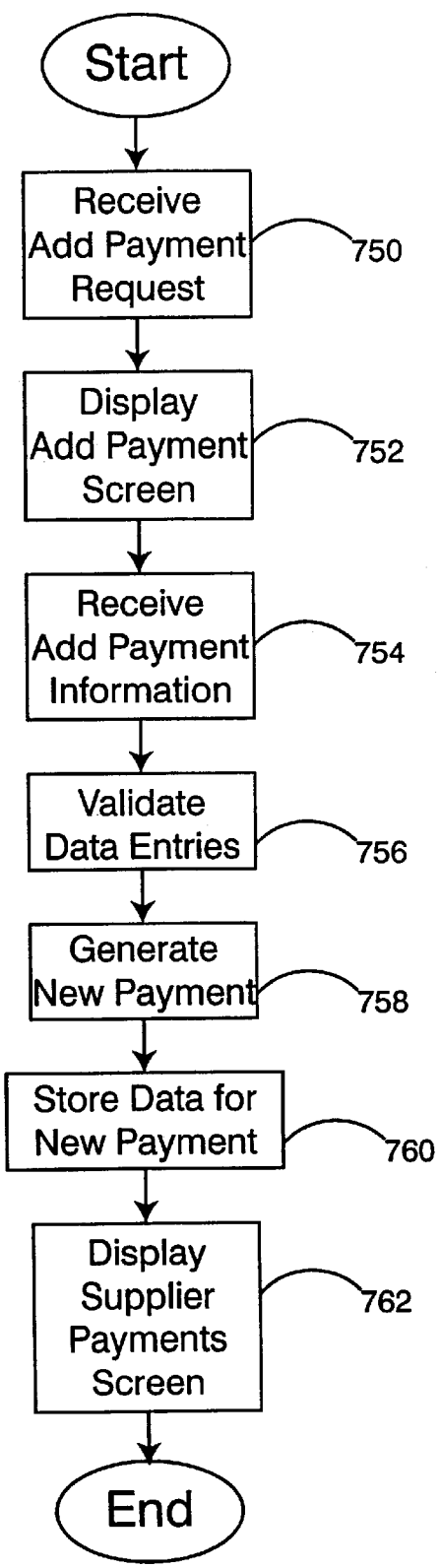
FIG. 18 is a flow diagram showing one embodiment of a process for adding a new payment to the CPS.

FIG. 18 is a flow diagram showing one embodiment of a process for adding a new payment to the CPS 12 through the supplier payment section 88 of the convention processing engine 60. As previously described, the payment information is stored in the service section 46 of the database server 32. The method begins at step 750 where the CPS 12 receives an add payment request from the system operator. A system operator makes this request by clicking the add payment button 706 on the supplier payment screen 700. At step 752, the CPS 12 displays an add payment screen to the system operator. The add payment screen includes user entry fields for each item of information needed to set up a payment for a supplier. At step 754, the CPS 12 receives add payment information from the system operator. After validating the data entries at step 756, the CPS 12 generates a new payment at step 758. At step 760, the CPS 12 stores the data for the new payment in the service section 46 of the database server 32. At step 762, the CPS 12 displays the supplier payment screen 700, which includes a summary of the information relating to the new payment in the supplier payments table 702 and an updated supplier settlement summary 704, at which point the method ends.

Figure 19:
FIG. 19 is a screen diagram depicting one embodiment of an add supplier payment screen displayed to a user during the process of FIG. 18.

FIG. 19 is a screen diagram depicting one embodiment of an add supplier payment screen 770. The add supplier payment screen 770 includes a supplier information table 772 which includes entry fields for a payment date 774, a payment type 776 which may be selected from a drop-down menu comprising check, cash, credit card and the like, a reference number 778, and an amount 780. The add supplier payment screen 770 also includes the back button 164, the logout button 180, and an add payment button 782. Once a system operator has completed all of the required supplier information 772, the system operator clicks the add payment button 782 to send the information over the network 20 to the CPS 12. After clicking the add payment button 782, the system operator is provided with the supplier payment screen 700 from the CPS 12. At this point, the supplier payment screen 700 includes a line of information identifying the new payment in the supplier payments table 702.

FIG. 20 is a screen diagram depicting one embodiment of a select accounts screen 800. The select accounts screen 800 is displayed in response to a system operator clicking the accounts button 306 on the main menu screen 300 for a show. From the select accounts screen 800, a system operator may review and manipulate accounts.

The select accounts screen 800 includes an accounts table 802 and a plurality of buttons. The buttons include the back button 164, an add account button 804 for adding a new account to the account section 44 of the database server 32, an edit account button 806 for editing information relating to an existing account, a delete account button 808 for removing an existing account from the account section 44 of the database server 32, an account summary button 810 for accessing a plurality of functions for a particular account, such as placing orders, making payments and the like, an accounting button 812 for accessing accounting functions, a global note button 814 for posting a global note to every account included in the accounts section 44 of the database server 32 for a particular show, and the logout button 180.

The account table 802 includes summary information identifying all existing accounts. The summary information includes booth number, account name, account type, credit card, terms and conditions, and ship data. In order to select a particular account, the system operator clicks on a circle that corresponds to the account to be accessed. After an account is selected, the system operator may then click on one of the buttons 804, 806, 808, 810, 812 or 814 to perform the desired function for the selected account. For example, by selecting an account and clicking the account summary button 810, a system operator may access a summary of relevant data corresponding to the selected account. The account table 802 also includes a booth number filter 822, an account name filter 824 and an apply filter button 826 for filtering the accounts identified in the account table 802. For example, a system operator may click on the booth number filter 822 and provide a booth number in order to access only the accounts corresponding to that booth number. Additionally, a system operator may provide only part of a booth number in order to access the accounts corresponding to all booths beginning with the same number or numbers provided. The system operator may then click on the apply filter button 826 in order to have the CPS 12 filter out from the account table 802 information relating to any account that does not have the appropriate booth numbers. Alternatively, the CPS 12 could filter the account table 802 based on account names through the account name filter 824 or based on a combination of booth number and account names by receiving data in both filters 822 and 824 before the apply filter button 826 is clicked by a system operator. The account table 802 may also include a booth number sort 830 and an account name sort 832. If a system operator clicks on the booth number sort 830, the account table 802 is automatically sorted by the CPS 12 based on booth number, while if the system operator clicks on the account name sort 832, the account table 802 is automatically sorted by the CPS 12 based on account name.

Figure 21:
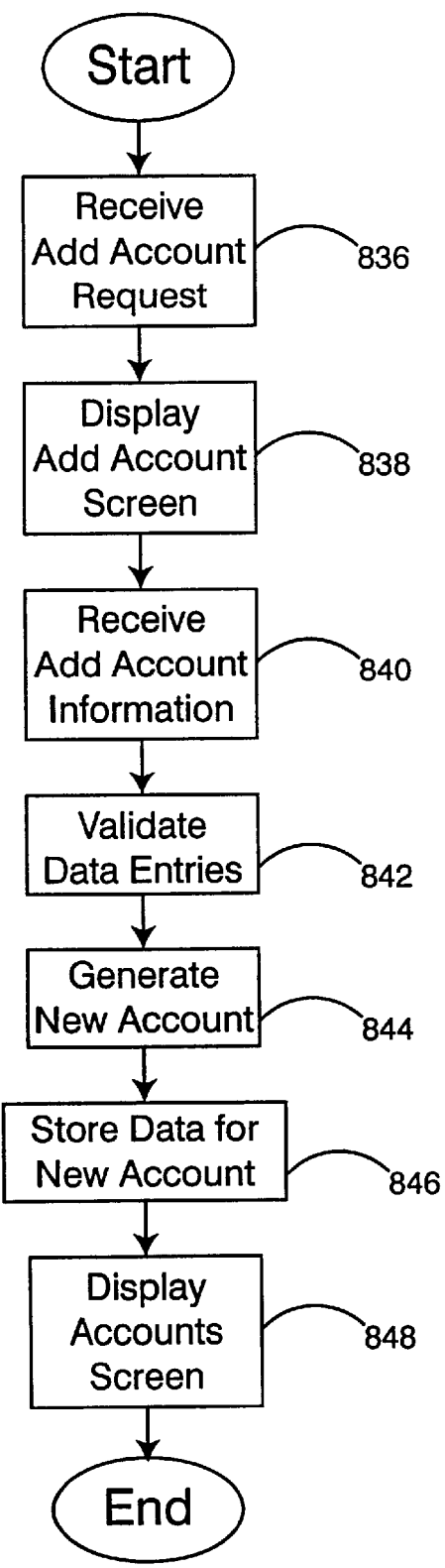
FIG. 21 is a flow diagram showing one embodiment of a process for adding a new account to the CPS.

FIG. 21 is a flow diagram showing one embodiment of a process for adding a new account to the CPS 12 through the account setup and maintenance section 72 of the convention processing engine 60. As previously described, the account information is stored in the account section 44 of the database server 32. The method begins at step 836 where the CPS 12 receives an add account request from the system operator. A system operator makes this request by clicking the add account button 804 on the account screen 800. At step 838, the CPS 12 displays an add account screen to the system operator. The add account screen includes user entry fields for each item of information needed to set up an account for a show. At step 840, the CPS 12 receives add account information from the system operator. After validating the data entries at step 842, the CPS 12 generates a new account at step 844. At step 846, the CPS 12 stores the data for the new account in the account section 44 of the database server 32. At step 848, a CPS 12 displays the account screen 800, which includes a summary of the information relating to the new account, at which point the method ends.

FIG. 22 is a screen diagram depicting one embodiment of an add account screen 850. The add account screen 850 includes account information 852, status flags 854, default information 856 and booth sign information 858. Entry fields for account information 852 include an account name 860, a job number 862 which corresponds to the default job number 250 unless modified by the system operator, an account type 864 which may comprise a drop-down menu of a plurality of account types used by the CPS 12 to determine functionality, and an exhibitor type 866 which comprises a drop-down menu of exhibitor types used by the CPS 12 to identify exhibitors that will receive higher priority customer service.

The status flags 854 include a credit card flag 870, a terms and conditions flag 872, a shipping data flag 874 and a tax exempt flag 876. The credit card flag 870 is marked by the CPS 12 to indicate that credit card information has been stored in the account section 44 of the database server 32 for the corresponding account. The terms and conditions flag 872 is marked by a system operator to indicate that a terms and conditions document was signed and returned by a representative of the customer to whom the account corresponds. The shipping data flag 874 is marked by a system operator to indicate that shipping information related to this account has been received. The tax exempt flag 876 is marked by a system operator to indicate that the account is exempt from taxes.

Entry fields for default information 856 include an address 878 for billing, including street address, city, state, country and zip codes. In accordance with one embodiment, the state and country information may be selected by the system operator through a drop-down menu. Entry fields for default information 856 also include a phone number 880 and a fax number 882 for contacting the customer.

Entry fields for booth sign information 858 include sign copy 884 and an address 886. The sign copy 884 includes a textual message for displaying on a sign at the corresponding booth. Typically, the sign copy 884 will correspond to the company name of the customer. The address 886 is another textual message for display on the sign that typically includes city, state and country information relating to the customer's place of business.

The add account screen 850 also includes an add button 888 and an add goto booth button 890. Once a system operator has completed all of the required information on the add account screen 850, the system operator clicks either the add button 888 or the add goto booth button 890. Clicking the add button 888 sends the information over the network 20 to the CPS 12. After clicking the add button 888, the system operator is provided with the select accounts screen 800 from the CPS 12. At this point, the select accounts screen 800 includes a line of summary information in the account table 802 that identifies the new account. If the system operator clicks the add goto booth button 890, on the other hand, the system operator is provided with an add booth screen for adding booth information such as booth number, booth depth, booth width, and booth type.

After completing the booth information on the add booth screen, the system operator is provided with an add contact screen for including contact information such as contact name, contact type, contact address, contact phone number, contact fax number, contact e-mail address, and contact comments. After completing all of the information on the add contact screen, the system operator is provided with an add credit card screen for including credit card information such as card number, card expiration date, card holder name, card holder address, and card comments. After completing all of the information on the add credit card screen, the information is sent over the network 20 to the CPS 12, and the system operator is provided with the updated account screen 800 as described above.

Thus, by returning to the add account screen 850 and clicking the add goto booth button 890, a plurality of booths may be assigned to a single account. Conversely, by providing the same booth number at the add booth screen for more than one account, a plurality of accounts may be assigned to a single booth.

Figure 23:
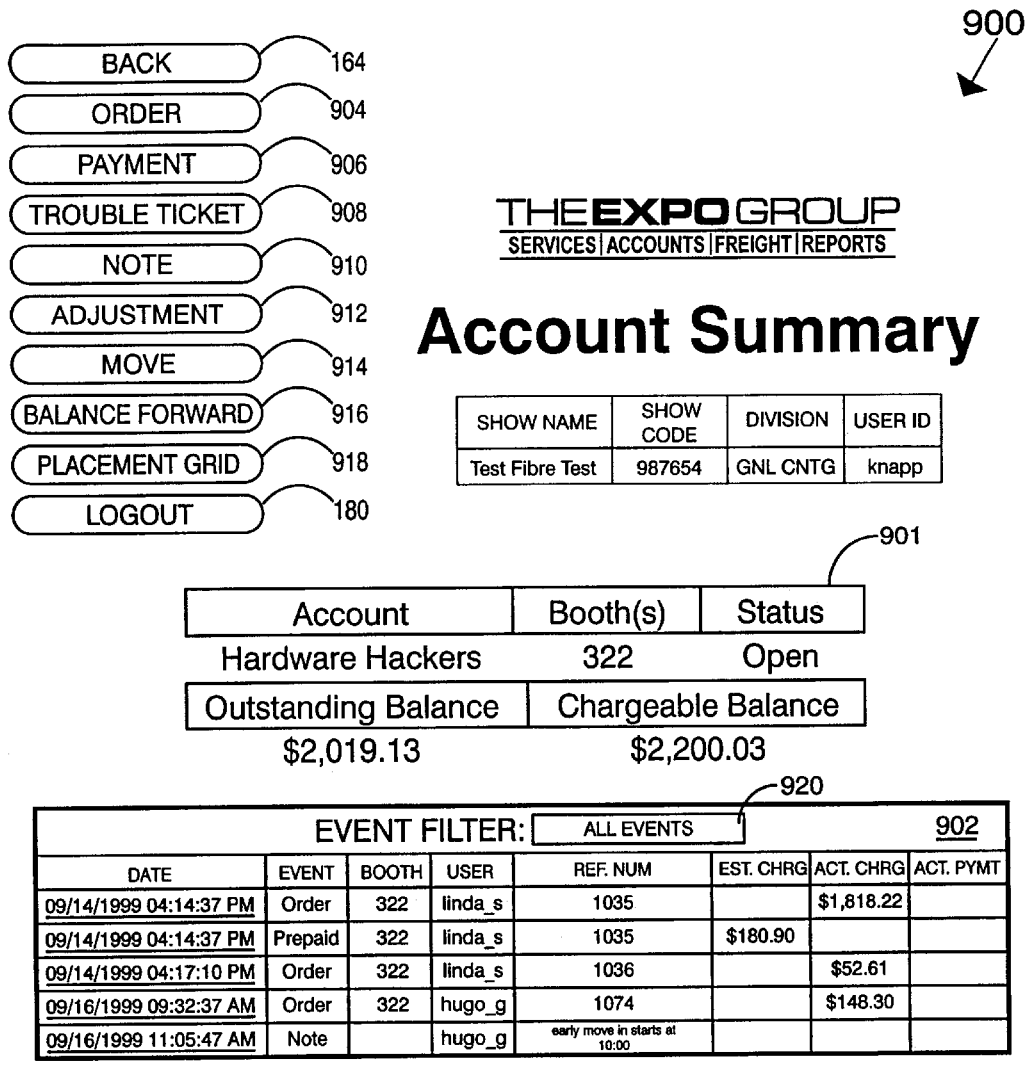
FIG. 23 is a screen diagram depicting one embodiment of an account summary screen displayed to a user upon selection of an account and the account summary function from the select accounts screen of FIG. 20.

FIG. 23 is a screen diagram depicting one embodiment of an account summary screen 900. The account summary screen 900 is displayed in response to a system operator selecting an account and clicking the account summary button 810 on the account screen 800. The account summary screen 900 includes an account information table 901, an account summary table 902 and a plurality of buttons. The buttons include the back button 164, an order button 904 for placing orders, a payment button 906 for entering payments, a trouble ticket button 908 for adding and recording trouble tickets, a note button 910 for recording a note to an account, an adjustment button 912 for providing an adjustment to an account balance, a move button 914 for automatically moving data associated with one booth to another booth, a balance forward button 916 for moving a customer's balance forward from one show to another, a placement grid button 918 for viewing a placement grid, and the logout button 180. The account information table 901, which is displayed on a plurality of the screens described below, includes identifying information for the corresponding account, including an account name, a plurality of booth numbers, a status, an outstanding balance, and a chargeable balance.

The account summary table 902 includes an event filter 920. The event filter 920 comprises a drop-down menu from which a system operator may select which type of events are to be displayed in the account table 902. For example, the system operator may select from orders, pre-paids, notes, or all events. The account summary table 902 includes identifying information for a plurality of events, such as event date, event type, booth number, user name, reference number, estimated charge, actual charge, and actual payment. The identifying information may comprise a link to access more detailed information. For example, a system operator may click on the date of the event to access more information regarding the associated event.

After accounts have been set up, a system operator may place orders, each comprising one or more items, for the accounts through the convention processing engine 60, as described in more detail below in connection with FIGS. 24–30.

Figure 24:
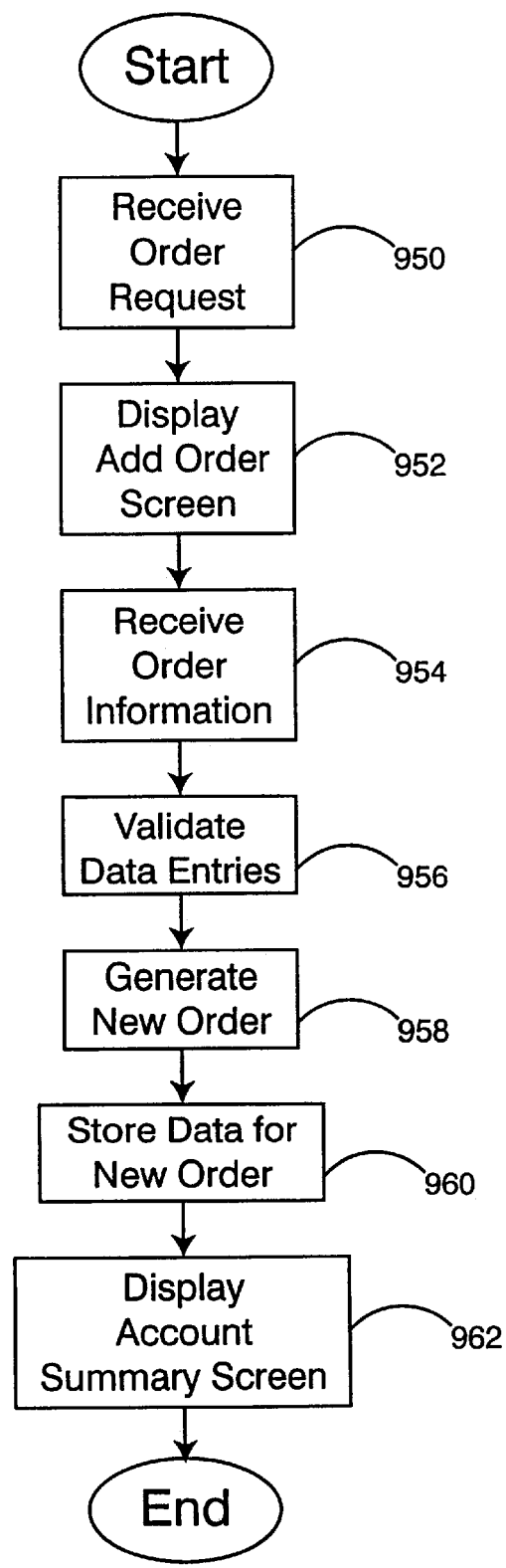
FIG. 24 is a flow diagram showing one embodiment of a process for adding a new order to the CPS.

FIG. 24 is a flow diagram showing one embodiment of a process for adding a new order to the transaction section 50 of the database server 32 through the orders/cancellation section 89 of the convention processing engine 60. The method begins at step 950 where the CPS 12 receives an order request for an account from the system operator. A system operator makes this request by clicking the order button 904 on the account summary screen 900. At step 952, the CPS 12 displays an add order screen to the system operator. The add order screen includes user entry fields for each item of information needed to set up an order for one or more items. At step 954, the CPS 12 receives order information from the system operator. After validating the data entries at step 956, the CPS 12 generates a new order at step 958. At step 960, the CPS 12 stores the data for the new order in the transactions section 50 of the database server 32. At step 962, the CPS 12 displays the account summary screen 900, which includes a summary of the information relating to the new order in the account summary table 902, at which point the method ends.

Figure 25:
FIG. 25 is a screen diagram depicting one embodiment of an add order screen displayed to a user during the process of FIG. 24.

FIG. 25 is a screen diagram depicting one embodiment of an add order screen 980. The add order screen 980 includes an order information table 982, in addition to the back button 164 and the logout button 180. The order information table 982 includes an account name 984, a received date 986, an order type 988 and a booth number 990. The account name 994 is displayed by the CPS 12. By default, the received date 986 is the current date on which a system operator is placing the order. However, the system operator may change the received date 986 to correspond to a date on which the customer actually placed the order. The order type 988 may be selected from a drop-down menu comprising pre-show or on-site. The order type is pre-show if it is received by the discount deadline date 256. Otherwise, the order type is on-site. By default, the CPS 12 displays the order type 988 as pre-show. However, a system operator may change the order type 988 as required. The booth number may be selected from a drop-down menu including a plurality of booth numbers corresponding to the booths assigned to the account. The add order screen 980 also includes a continue button 992. Once a system operator has completed all of the required information on the add order screen 980, the system operator clicks the continue button 992 to access an order summary screen.

Figure 26:
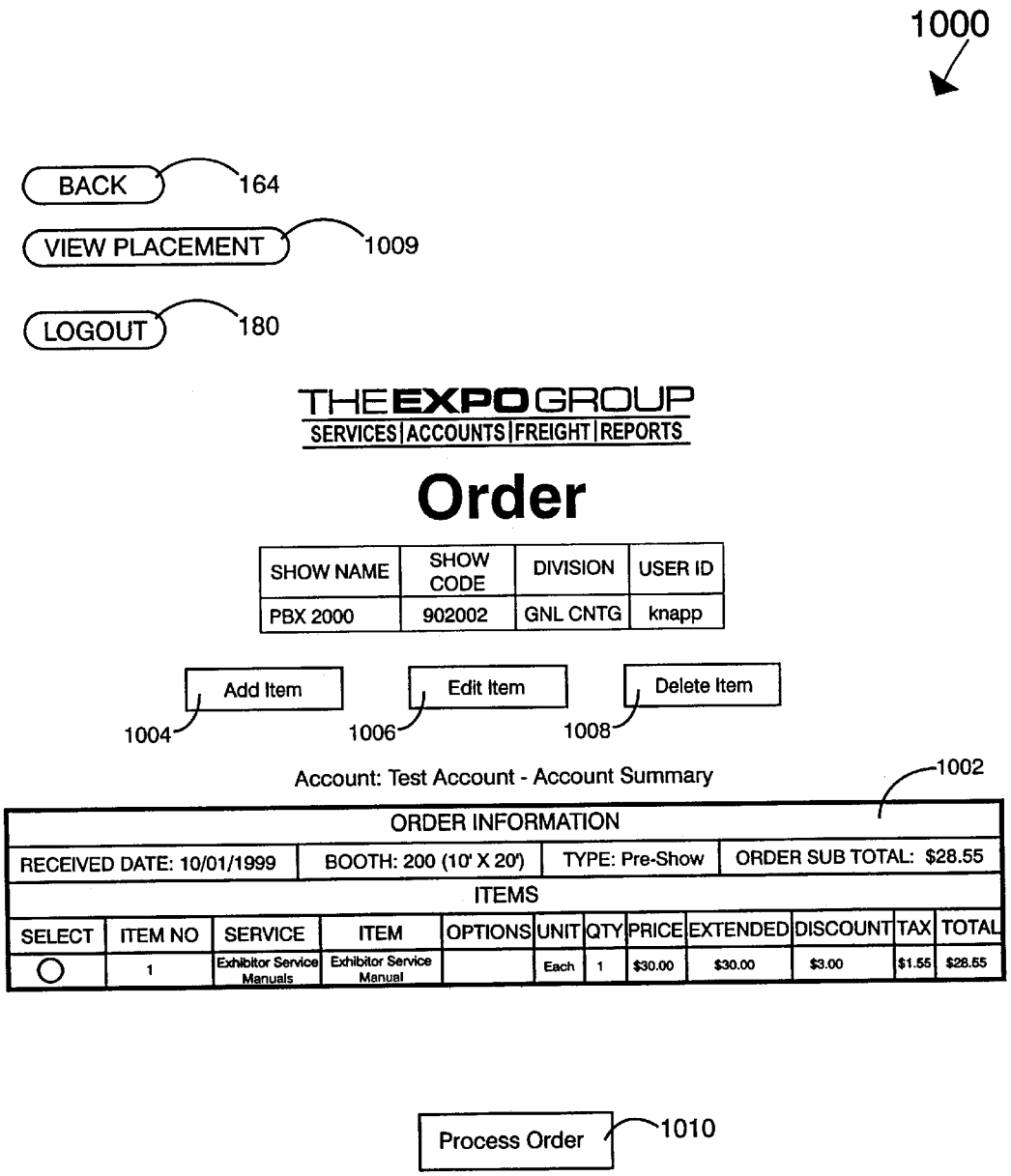
FIG. 26 is a screen diagram depicting one embodiment of an order summary screen displayed to a user during the process of FIG. 24.

FIG. 26 is a screen diagram depicting one embodiment of an order summary screen 1000. The order summary screen 1000 includes an order information table 1002, an add item button 1004, an edit item button 1006, a delete item button 1008, a view placement button 1009, and a clear order information button, in addition to the back button 164 and the logout button 180. The order information table 1002 includes identifying information for a plurality of items, such as item number, service name, item description, item options, unit of measure, quantity, price, and pricing information. The add item button 1004 allows a system operator to add a new item to an order. The edit item button 1006 allows a system operator to edit an existing item in an existing order. The delete item button 1008 allows a system operator to delete an existing item from an existing order. The view placement button 1009 allows a customer to view a graphical depiction of the placement of items in a booth, as described in more detail below in connection with FIG. 29. In order to select a particular item, the system operator clicks on a circle that corresponds to the item to be accessed. After the item is selected, the system operator may then click on one of the buttons 1004, 1006 or 1008 to perform the desired function for the selected order. The clear order information button clears the information received for the order in the add order screen 980. Thus, when the clear order information button is clicked, the order is canceled before any items have been included in the order.

Figure 27:
FIG. 27 is a screen diagram depicting one embodiment of an add item screen displayed to a user during the process of FIG. 24.

FIG. 27 is a screen diagram depicting one embodiment of an add item screen 1020. The add item screen 1020 is displayed in response to a system operator clicking the add item button 1004 on the order summary screen 1000. The add item screen 1020 includes an order information table 1022, a service selector 1024 and an item selector 1026, in addition to the back button 164 and the logout button 180. The order information table 1022 includes the received date, the order type, and the booth number, as input into the order information 982 on the add order screen 980. The order information table 1022 may also include an order subtotal which is a current total for the order without service charges and the like. The service selector 1024 comprises a drop-down menu from which a system operator may select a service from which an item will be selected. The item selector 1026 comprises a drop-down menu which includes a list of items within the service selected by the service selector 1024. Thus, for example, if the service selected in the service selector 1024 is carpet, the items displayed in the drop-down menu of the item selector 1026 will be items available within the carpet service. The add item screen 1020 also includes an item details button 1028. Once a system operator has completed all of the required information on the add item screen 1020, the system operator clicks the item details button 1028 to access an items details screen.

FIGS. 28A–D are screen diagrams depicting embodiments of an item details screen 1050. The item details screen 1050 is displayed in response to a system operator clicking the item details button 1028 on the add items screen 1020. The items selected in the item selector 1026 of the add item screen 1020 may be a labor item, a master item, a placement item, or a normal item. A labor item is an item that requires a worker to perform labor, a master item is an item that includes a plurality of sub-items, a placement item is an item that allows the customer to specify the placement of the item in the booth, and a normal item is any other type of item.

FIG. 28A is a screen diagram depicting one embodiment of an item details screen 1050 which may be displayed in response to a normal item being ordered. The item details screen 1050 includes order information 1052, in addition to the back button 164 and the logout button 180. The order information 1052 includes the order information 1022 displayed on the add item screen 1020. This includes an order subtotal which is automatically generated by the CPS 12 based on other data entered into the order information 1052. The order information 1052 further comprises a service line 1062 that describes the type of service being ordered, an item 1064 that describes the item being ordered, and an options menu 1066 that comprises a drop-down menu of options available for the corresponding item 1064. The order information 1052 also comprises a quantity 1068 for specifying how many of the items 1064 are being ordered, a price 1070 that is generated by the CPS 12 based on the customer type and the date of the order as described in more detail above in connection with FIG. 16, a unit of measure 1072, an item comment 1074 and an item note 1076. The item details screen 1050 also includes a save button 180. Once a system operator has completed all of the required information on the item details screen 1050, the system operator clicks the save button 1080 to continue with the order.

FIG. 28B is a screen diagram depicting one embodiment of an item details screen 1050 which may be displayed in response to a labor item being ordered. The item details screen 1050 includes order information 1052, in addition to the back button 164 and the logout button 180. The order information 1052 includes the order information 1022 displayed on the add item screen 1020. The order information 1052 further comprises a service line 1062 that describes the type of service being ordered and an item 1064 that describes the item being ordered. The order information 1052 also comprises a price 1070 that is generated by the CPS 12 based on the customer type and the date of the order as described in more detail above in connection with FIG. 16, a unit of measure 1072, an item comment 1074 and an item note 1076.

In contrast to the item details screen 1050 of FIG. 28A, the item details screen 1050 of FIG. 28B includes a labor selection section 1082. The labor selection section 1082 allows a system operator to request when a worker or workers will complete the labor required for the ordered item. The labor selection section 1082 includes a start date/time 1084, an end date/time 1086, a number of laborers 1088, and a total man hours 1090 which is generated by the CPS 12 based on the entries into the start date/time 1084, end date/time 1086, and number of laborers 1088.

The item details screen 1050 also includes a save button 180. Once a system operator has completed all of the required information on the item details screen 1050, the system operator clicks the save button 1080 to continue with the order.

FIG. 28C is a screen diagram depicting one embodiment of an item details screen 1050 which may be displayed in response to a master item being ordered. The item details screen 1050 includes order information 1052, in addition to the back button 164 and the logout button 180. The order information 1052 includes the order information 1022 displayed on the add item screen 1020. The order information 1052 further comprises a service line 1062 that describes the type of service being ordered, an item 1064 that describes the item being ordered, and an options menu 1066 that comprises a drop-down menu of options available for the corresponding item 1064. The order information 1052 also comprises a quantity 1068 for specifying how many of the items 1064 are being ordered, a price 1070 that is generated by the CPS 12 based on the customer type and the date of the order as described in more detail above in connection with FIG. 16, a unit of measure 1072, and an item note 1076. The item details screen 1050 of FIG. 28C includes sign header copy 1094 for entering a textual message to be printed on a sign. Although the embodiment shown includes sign header copy 1094, it will be understood that any other suitable prompt may be included in any item details screen 1050 through the specialized prompt 678, as shown in FIG. 16, when the associated item is added to the CPS 12.

In contrast to the item details screen 1050 of FIG. 28A, the item details screen 1050 of FIG. 28C includes an options section 1096. The options section 1096 includes a description 1098, an options drop-down menu 1100, a quantity 1102, and a unit of measure 1104 for each sub-item. Thus, the CPS 12 increases ordering efficiency by allowing a system operator to order multiple sub-items through a single master item order, instead of requiring the system operator to order each of the sub-items separately.

The item details screen 1050 also includes a save button 180. Once a system operator has completed all of the required information on the item details screen 1050, the system operator clicks the save button 1080 to continue with the order.

FIG. 28D is a screen diagram depicting one embodiment of an item details screen 1050 which may be displayed in response to a placement item being ordered. The item details screen 1050 includes order information 1052, in addition to the back button 164 and the logout button 180. The order information 1052 includes the order information 1022 displayed on the add item screen 1020. The order information 1052 further comprises a service line 1062 that describes the type of service being ordered, an item 1064 that describes the item being ordered, and an options menu 1066 that comprises a drop-down menu of options available for the corresponding item 1064. The order information 1052 also comprises a quantity 1068 for specifying how many of the items 1064 are being ordered, a price 1070 that is generated by the CPS 12 based on the customer type and the date of the order as described in more detail above in connection with FIG. 16, a unit of measure 1072, an item comment 1074 and an item note 1076.

In contrast to the item details screen 1050 of FIG. 28A, the item details screen 1050 of FIG. 28D includes a placement section 1110 for selecting the placement of the item in the booth. The system operator may select from standard placement 1112 for placing the item in a standard location or custom placement 1114 for placing the item in a non-standard location. For custom placement 1114, the system operator indicates how many feet up 1116 and how many feet over 1118 the item is to be placed from a designated corner of the booth.

The item details screen 1050 also includes a save button 180. Once a system operator has completed all of the required information on the item details screen 1050, the system operator clicks the save button 1080 to continue with the order. For placement items, the CPS 12 displays an item placement screen at this point, as described in more detail below in connection with FIG. 29.

FIG. 29 is a screen diagram depicting one embodiment of an item placement screen 1150. The item placement screen 1150 is displayed in response to a system operator clicking the save button 1080 on the item details screen 1050 for a placement item. The item placement screen 1150 is also displayed in response to a system operator clicking the placement grid button 918 on the account summary screen 900 or by clicking the view placement button 1012 on the order summary screen 1000.

The item placement screen 1150 includes a placement grid 1152, a placement table 1154 and a close button 1156, in addition to the back button 164 and the logout button 180. The placement grid 1152 is a graphical depiction of the placement of items in a booth. The placement grid 1152 is automatically generated based on the booth width and booth depth. The placement grid 1152 identifies the booths adjacent to the customer's booth with booth numbers and arrows. The placement grid 1152 also identifies each item placed within the booth based on how many feet up and over the item is from a corner of the booth. The placement table 1154 includes identifying information for a plurality of placement items, such as placement, item description and quantity. For example the placement table 1154 may, for each placement item, include how many feet up and how many feet over the item is from a booth corner, as well as a description of the item and how many have been ordered. Once a system operator is finished viewing the item placement screen 1150, the system operator clicks the close button 1156. The CPS 12 then displays the order summary screen 1000 or the account summary screen 900, depending on which screen was displayed when the placement grid was requested.

After an item for a particular order has been selected, the CPS 12 displays the order summary screen 1000, which includes a summary of the information relating to the item or items for the order in the order information table 1002. The system operator may then add another item to the order or complete the order. After at least one item has been included in the order, the order summary screen 1000 includes a process order button 1010 instead of the clear order information button. After all the items for an order have been selected, the system operator clicks on the process order button 1010 which causes the CPS 12 to display an order confirmation screen. Thus, the CPS 12 allows a plurality of items to be included in a single order.

FIG. 30 is a screen diagram depicting one embodiment of an order confirmation screen 1200. The order confirmation screen 1200 is displayed in response to a system operator clicking the process order button on the order summary screen 1000. The order confirmation screen 1200 includes the order information table 1002 as displayed on the order summary screen 1000, in addition to a post order button 1204, a cancel button 1206, the back button 164 and the logout button 180. The order information table 1002 on the order confirmation screen 1200 includes service charges in accordance with the service charge information 376 entered on the add service screen 370. After viewing all of the items for the order with their corresponding service charges, the order may be completed by clicking the post order button 1204 or canceled by clicking the cancel button 1206. After the order is posted or canceled, the appropriate information is sent over the network 20 to the CPS 12 and the CPS 12 displays the account summary screen 900.

Figure 31:
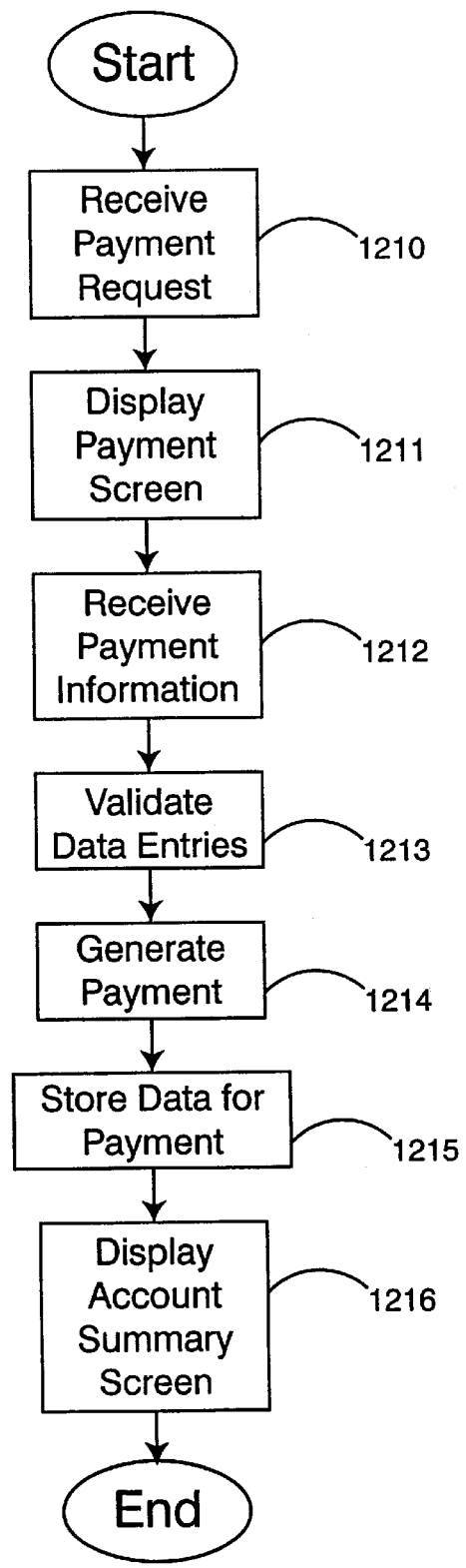
FIG. 31 is a flow diagram showing one embodiment of a process for adding a new payment to the CPS.

FIG. 31 is a flow diagram showing one embodiment of a process for adding a new payment to the transaction section 50 of the database server 32 through the other transaction section 90 of the convention processing engine 60. The method begins at step 1210 where the CPS 12 receives a payment request from the system operator. A system operator makes this request by clicking the payment button 906 on the account summary screen 900. At step 1211, the CPS 12 displays the payment screen to the system operator. At step 1212, the CPS 12 receives payment information from the system operator. After validating the data entries at step 1213, the CPS 12 generates a payment at step 1214. At step 1215, the CPS 12 stores the data for the payment in the transaction section 50 of the database server 32 where the data may be used to credit the appropriate account. At step 1216, the CPS 12 displays the account summary screen 900 which includes a summary of the information relating to the payment in the account summary table 902, at which point the method ends.

Figure 32:
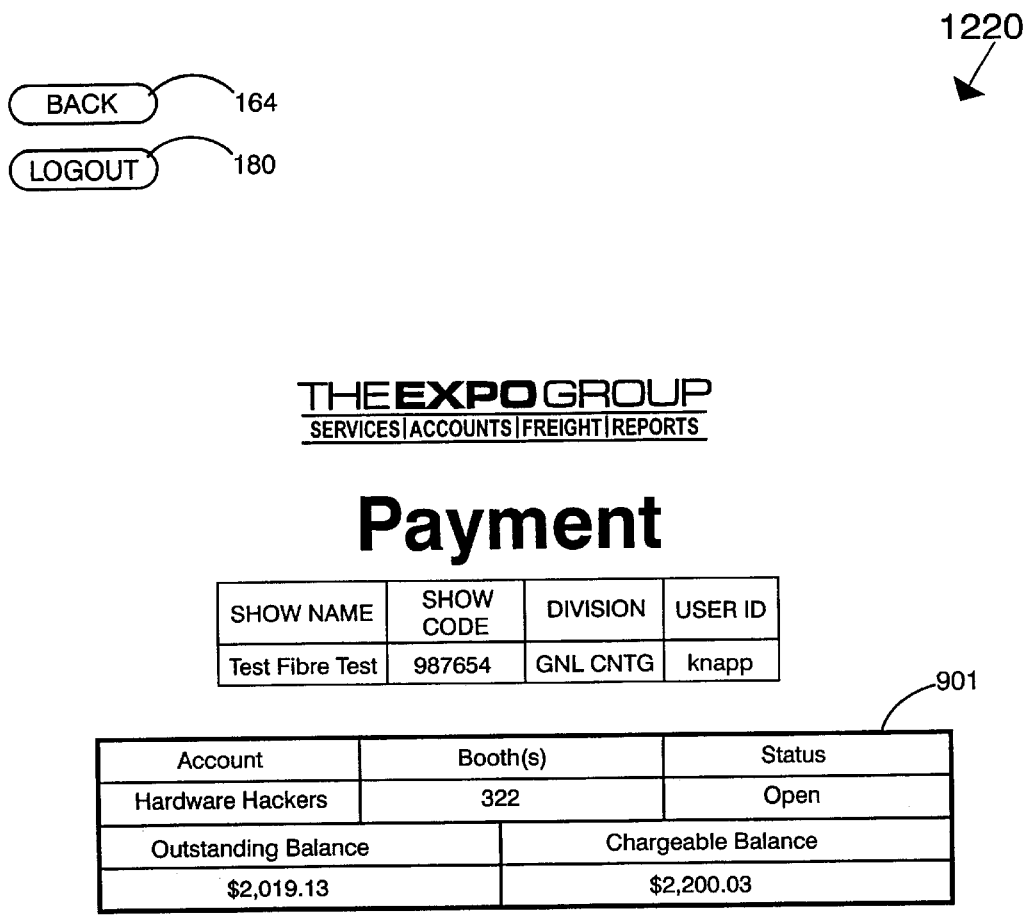
FIG. 32 is a screen diagram depicting one embodiment of a payment screen displayed to a user during the process of FIG. 31.

FIG. 32 is a screen diagram depicting one embodiment of a payment screen 1220. The payment screen 1220 includes the account information table 901, a check button 1224 for entering a payment by check, a new credit card button 1226 for entering a payment with a new credit card, a cash/wire transfer button 1228 for entering a payment by cash or wire transfer, an existing credit card button 1230 for entering a payment by an existing credit card, the back button 164 and the logout button 180. When a system operator clicks the check button 1224, the CPS 12 displays a check payment screen for entering payment amount and check number. When a system operator clicks the new credit card button 1226, the CPS 12 displays a credit payment screen for entering a payment amount, an authorization number, a card number, a cardholder name, an expiration date, a cardholder address, and comments. When a system operator clicks the cash/wire transfer button 1228, the CPS 12 displays a cash/wire payment screen for entering payment amount and reference number information. When a system operator clicks the existing credit card button 1230, the CPS 12 displays a credit payment screen with existing credit card information for the account for entering the payment amount. Once a system operator has completed the information relating to the payment, the CPS 12 displays the account summary screen 900 which includes a line of summary information identifying the new payment in the account summary table 902.

Figure 33:
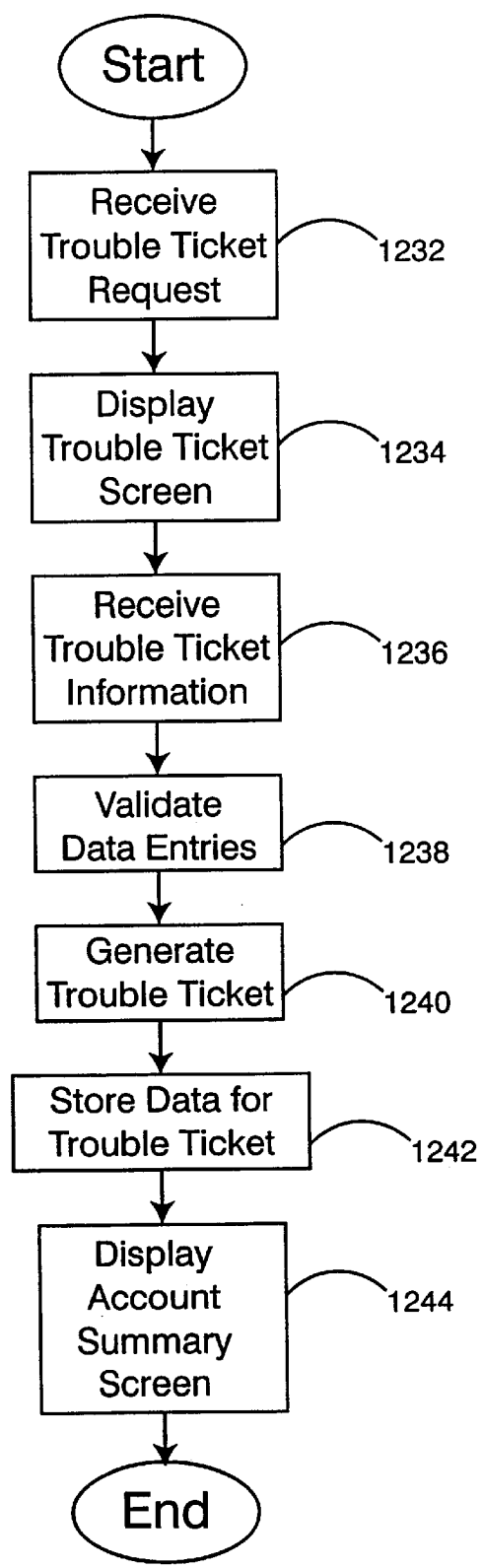
FIG. 33 is a flow diagram showing one embodiment of a process for creating a trouble ticket with the CPS.

FIG. 33 is a flow diagram showing one embodiment of a process for creating a trouble ticket. A trouble ticket is used to notify the convention processing company of a problem that needs to be resolved for a customer. The method begins at step 1232 where the CPS 12 receives a trouble ticket request from the system operator. The system operator makes this request by clicking the trouble ticket button 908 on the account summary screen 900. At step 1234, the CPS 12 displays the trouble ticket screen to the system operator. At step 1236, the CPS 12 receives trouble ticket information from the system operator. After validating the data entries at step 1238, the CPS 12 generates a trouble ticket at step 1240. At step 1243, the CPS 12 stores data for the trouble ticket in the database server 32. At step 1244, the CPS 12 displays the account summary screen 900, which includes a summary of the information relating to the trouble ticket in the account summary table 902, at which point the method ends.

FIG. 34 is a screen diagram depicting one embodiment of a trouble ticket screen 1250. The trouble ticket screen 1250 includes the account information table 901, a service trouble button 1254, a missing freight button 1256, the back button 164 and the logout button 180. For problems with any service other than freight, the system operator clicks the service trouble button 1254. This causes the CPS 12 to display a service ticket screen for receiving information such as the service type, a description of the problem, and a booth number for identifying the booth with the problem. For missing freight, the system operator clicks the missing freight button 1256. This causes the CPS 12 to display a freight ticket screen for entering information such as the carrier name, the booth number, the name of the person who reported the problem, the type of freight missing, the number of pieces missing and a description of the missing pieces. Once the system operator has completed the required information on the service ticket screen or the freight ticket screen, the CPS 12 generates a service trouble ticket or a missing freight ticket. The CPS 12 then displays the account summary screen 900. At this point the account summary screen 900 includes a line of summary information identifying the trouble ticket that has just been generated by the system operator.

Figure 35:
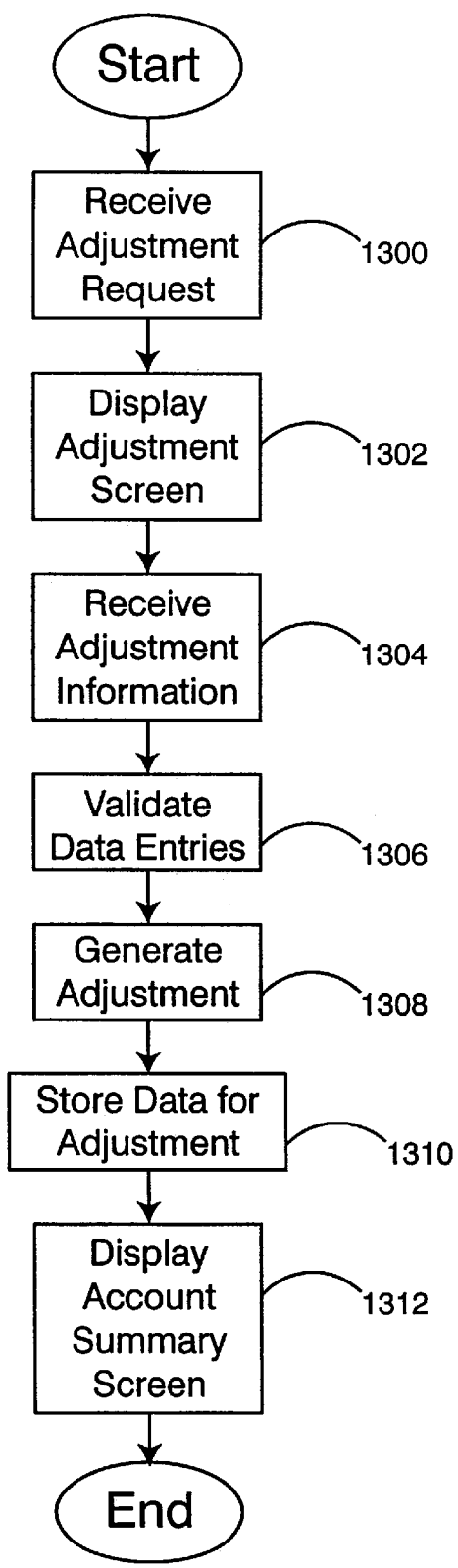
FIG. 35 is a flow diagram showing one embodiment of a process for entering an adjustment to the CPS.

FIG. 35 is a flow diagram showing one embodiment of a process for entering an adjustment to the transaction section 50 of the database server 32 through the other transaction section 90 of the convention processing engine 60. An adjustment is used to credit an account for a specified amount in relation to a specified service. This may be used, for example, to credit an account for a service that was not performed or that was not performed adequately. The method begins at step 1300 where the CPS 12 receives an adjustment request from the system operator. A system operator makes this request by clicking the adjustment button 912 on the account summary screen 900. At step 1302, the CPS 12 displays the adjustment screen to the system operator. At step 1304, the CPS 12 receives adjustment information from the system operator. After validating data entries at step 1306, the CPS 12 generates an adjustment at step 1308. At step 1310, the CPS 12 stores the data for the adjustment in the transaction section 50 of the database server 32. At step 1312, the CPS 12 displays the account summary screen 900, which includes a summary of the information relating to the adjustment in the account summary table 902 at which point the method ends.

FIG. 36 is a screen diagram depicting one embodiment of an adjustment screen 1320. The adjustment screen 1320 includes the account information table 901 and a credit information table 1324, in addition to the back button 164 and the logout button 180. The credit information table 1324 includes a service type selector 1326 which is a drop-down menu including a list of the services available, an adjustment amount 1328 which is the dollar amount of the adjustment to the account, and a comments field 1330 for entering a reason for the adjustment. The adjustment screen 1320 also includes a save button 1332. Once a system operator has completed the information in the credit information table 1324, the system operator clicks the save button 1332 to send the information over the network 20 to the CPS 12. After clicking the save button 1332, the system operator is provided with the account summary screen 900 from the CPS 12. At this point, the account summary screen 900 includes a line of summary information identifying the new adjustment in the account summary table 902.

Figure 37:
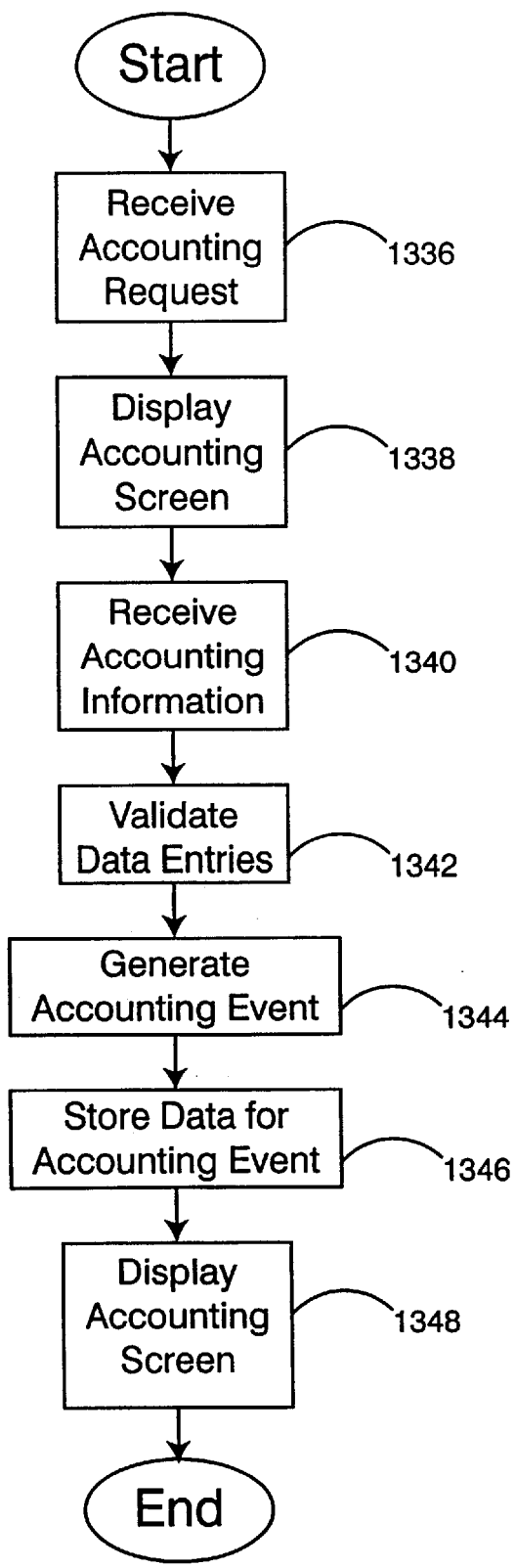
FIG. 37 is a flow diagram showing one embodiment of a process for adding an accounting event to the CPS.

FIG. 37 is a flow diagram showing one embodiment of a process for adding an accounting event to the transaction section 50 of the database server 32 through the other transaction section 90 of the convention processing engine 60. The method begins at step 1336 where the CPS 12 receives an accounting request from the system operator. The system operator makes this request by clicking the accounting button 812 on the account screen 800. At step 1338, the CPS 12 displays the accounting screen to the system operator. At step 1340, the CPS 12 receives accounting information from the system operator. After validating the data entries at step 1342, the CPS 12 generates an accounting event at step 1344. These events may include, for example, a fee, a refund and a reversed payment. At step 1346, the CPS 12 stores the data for the new accounting event in the transaction section 50 of the database server 32. At step 1348, the CPS 12 displays the accounting screen, which includes a summary of the information relating to the new accounting event, at which point the method ends.

FIG. 38 is a screen diagram depicting one embodiment of an accounting screen 1350. The accounting screen includes the account information table 901, an accounting table 1354 and a plurality of buttons. The buttons include the back button 164, a fee button 1356 for generating a fee, a refund button 1358 for generating a refund, a reversed payment button 1360 for reversing a payment, and a logout button 180. A fee event is generated to debit or credit a customer's account for fees, such as a returned check fee. A refund event is generated to credit a customer's account for a refund that is due to the customer. A reversed payment event is generated to debit a customer's account when the customer's payment is not completed. For example, if a customer's check does not clear, a reversed payment event is generated to reverse the earlier credit given to the customer's account when the payment was received. The accounting table 1354 includes an event filter 1362 for filtering the events that are displayed in the accounting table 1354. For example, a system operator may select from a drop down menu to view only refund events, only fee events, only reversed payment events, or all events. The accounting table 1354 includes identifying information for a plurality of accounting events, such as date, event type, booth number, user name, reference number, estimated charges, actual charges, and actual payments. A system operator may click on a link, such as the date for an accounting event, in order to view more details concerning the event.

If a system operator clicks the fee button 1356, the CPS 12 displays a fee screen for entering the fee amount, whether the fee is a debit or credit, and any comments to be associated with the fee. If a system operator clicks on the refund button 1358, the CPS 12 displays a refund screen for receiving refund information such as the refund amount and any comments associated with the refund. If the system operator clicks the reversed payment button 1360, the CPS 12 displays a reversed payment screen for entering reversed payment information such as the amount and any comments associated with the reversed payment. Once a system operator has completed the information in a fee screen, a refund screen, or a reversed payment screen, the information is sent over the network 20 to the CPS 12. The CPS 12 then displays the accounting screen 1350 which includes a summary of the information relating to the new accounting event in the accounting table 1354.

FIG. 39 is a screen diagram depicting one embodiment of a select freight screen 1380. The select freight screen 1380 is used to track freight from the point of receipt through delivery to the booth. The select freight screen 1380 is displayed in response to a system operator clicking the freight button 308 on the main menu screen 300. The select freight screen 1380 includes a freight table 1382 and a plurality of buttons. The buttons include the back button 164, an add freight button 1384 for adding a freight order to the transaction section 50 of the database server 32, an edit freight button 1386 for editing information relating to an existing freight order, a delete freight button 1388 for removing an existing freight order from the transaction section 50 of the database server 32, a freight charges button 1390 for charging freight orders, and the logout button 180.

The freight table 1382 includes identifying information for a plurality of freight orders, such as receiver number, account name, date received, trailer number, and status. In order to select a particular freight order, the system operator clicks on a circle the corresponds to the freight order to be accessed. After a freight order is selected, the system operator may then click on one of the buttons 1384, 1386, 1388 or 1390 to perform the desired function for the selected freight order. The freight table 1382 also includes a receiver filter 1394, an account name filter 1396 and a trailer filter 1398 for filtering the information displayed in the freight table 1382. A system operator may enter receiver numbers into the receiver filter 1394, account names into the account name filter 1396 and/or trailer numbers into the trailer filter 1398 before clicking an apply filter button 1400 to filter the information displayed so that only the appropriate freight orders with the identified receiver numbers, account names, and/or trailer numbers are displayed. The freight table 1382 also comprises an account name sort button 1404 for sorting the information in the freight table 1382 by account name and a date received sort button 1406 for sorting the information based on the date the freight was received. The select freight screen 1380 also includes a next set button 1410 and an update button 1412. If a system operator clicks the next set button 1410, another set of freight orders are displayed in the freight table 1382. For example, the freight table 1382 may display up to 100 freight orders at a time. In this example, the next set button 1410 would cause the CPS 12 to display the next 100 freight orders in the freight table 1382. The update button 1412 causes the CPS 12 to update any changes made by a system operator to the status and trailer number information in the freight table 1382.

Figure 40:
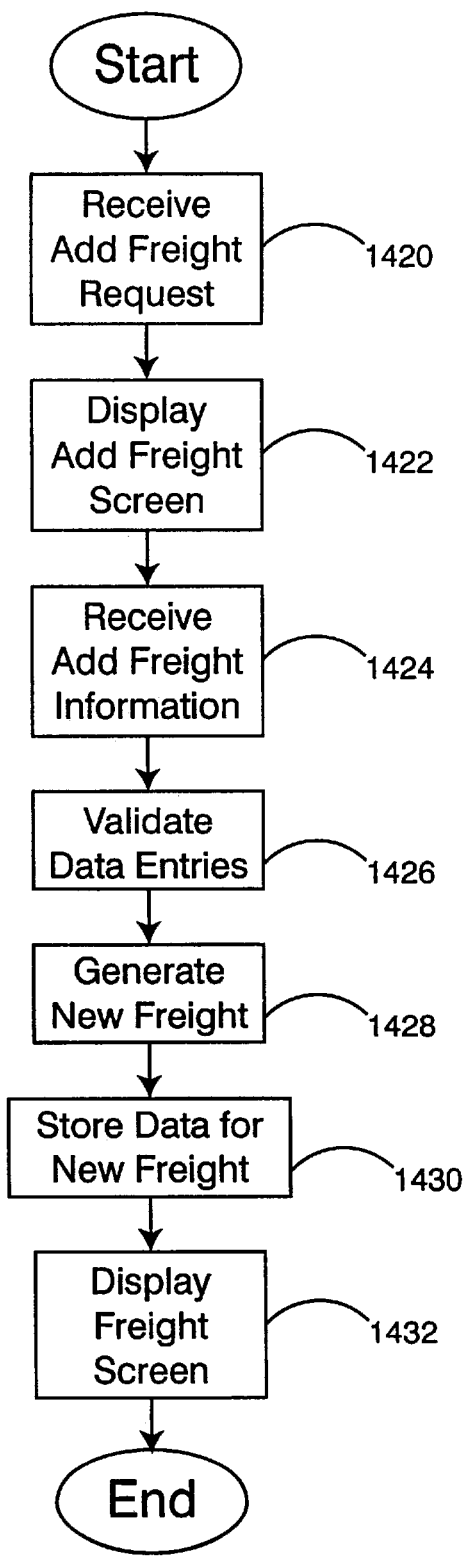
FIG. 40 is a flow diagram showing one embodiment of a process for adding a freight order to the CPS.

FIG. 40 is a flow diagram showing one embodiment of a process for adding a freight order to the transaction section 50 of the database server 32 through the freight tracking section 78 of the convention processing engine 60. The method begins at step 1420 where the CPS 12 receives an add freight request from the system operator. A system operator makes this request by clicking the add freight button 1384 on the select freight screen 1380 after selecting an account. At step 1422, the CPS 12 displays the add freight screen to the system operator. At step 1424, the CPS 12 receives add freight information from the system operator. After validating the data entries at step 1426, the CPS 12 generates a new freight order at step 1428. At step 1430, the CPS 12 stores the data for the new freight order in the transaction section 50 of the database server 32. At step 1432, the CPS 12 displays the select freight screen 1380 which includes a summary of the information relating to the new freight order in the freight table 1382, at which point the method ends.

Figure 41:
FIG. 41 is a screen diagram depicting one embodiment of an add freight screen displayed to a user during the process of FIG. 40.

FIG. 41 is a screen diagram depicting one embodiment of an add freight screen 1450. The add freight screen 1450 includes a freight information table 1452, in addition to the back button 164 and the logout button 180. The freight information table 1452 includes a receiver name 1454 which is the name of the person receiving the freight order, a receiver number 1456, a shipper name 1458 which is the name of the company shipping the freight, a pro number 1460 which is the freight company's tracking number, a check-in date 1462, which is the date and time that the freight is checked in, a received date 1464 which is the date and time the customer receives the freight, a number of pieces 1466 which is the number of pieces the freight is said to contain, a total weight 1468, a destination 1470 which comprises a drop-down menu for selecting from warehouse or direct-to-dock shipping, and a status 1472 which comprises a drop-down menu for selecting from waiting, received or delivered. The add freight screen 1450 also includes an add freight button 1474 and an add freight items button 1476. Clicking the add freight button 1474 sends the information over the network 20 to the CPS 12. Clicking the add freight items button 1476 causes the CPS 12 to display an add freight item screen for receiving information regarding the freight items within the freight order such as freight type, the number of pieces the freight items is said to contain, the actual number of pieces contained in the item, the weight, and any comments.

Figure 42:
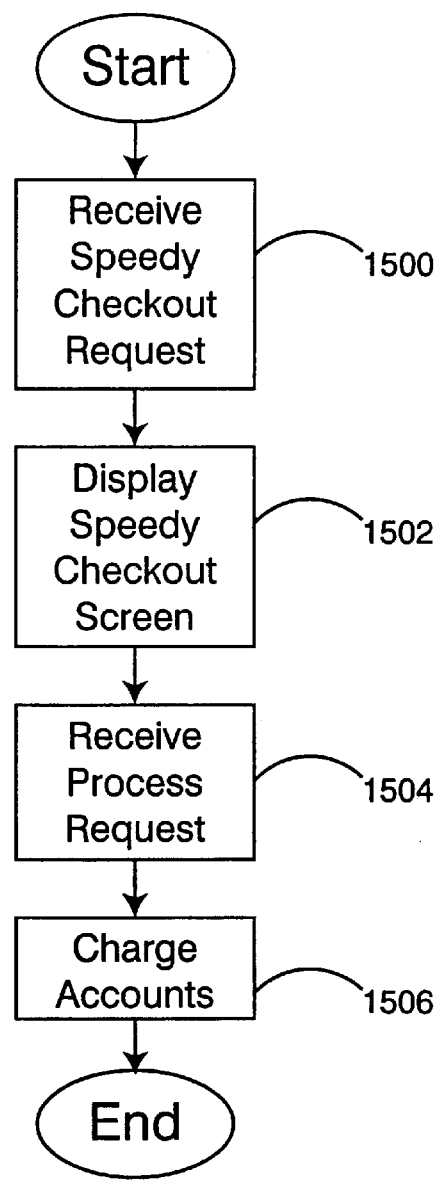
FIG. 42 is a flow diagram showing one embodiment of a process for performing a speedy checkout with the CPS.

FIG. 42 is a flow diagram showing one embodiment of a process for performing a speedy checkout for a show. The method begins at step 1500 where the CPS 12 receives a speedy checkout request from the system operator. A system operator makes this request by clicking the speedy checkout button 314 on the main menu screen 300. At step 1502, the CPS 12 displays the speedy checkout screen to the system operator. At step 1504, the CPS 12 receives a process request from the system operator. At step 1506, the CPS 12 charges every account for the show for which a credit card is flagged as a primary card and which has a balance greater than the base amount 258. A credit card is flagged as a primary card when a customer has authorized the convention processing company to apply all charges to this account.

FIG. 43 is a screen diagram depicting one embodiment of a speedy checkout screen 1520. When a system operator clicks the speedy checkout button 314 on the main menu screen 300, the CPS 12 searches through the accounts in the account table 1522 for those with credit card information stored in the account section 44 of the database server 32 for a primary card and with balances greater than the base amount 258. The CPS 12 then displays the speedy checkout screen 1520, which includes an account table 1522. The account table 1522 includes account names 1524 and account balances 1526. The speedy checkout screen 1520 also includes a process button 1528. When a system operator clicks the process button 1528, the CPS 12 charges the outstanding balance for each of the accounts displayed in the account table 1522 to the credit cards on file. Thus, the CPS 12 increases efficiency in charging accounts by automatically charging a plurality of accounts when a system operator clicks the process button 1528, instead of requiring the system operator to access and charge each account separately.

FIG. 44 is a screen diagram depicting one embodiment of a deposit batch screen 1540. The deposit batch screen 1540 is used by accounting personnel to match customer payments with bank deposits. The deposit batch screen 1540 is displayed in response to a system operator selecting a show and clicking the daily deposits button 168 on the select show screen 160. The deposit batch screen 1540 includes a batch table 1542 and a plurality of buttons. The buttons include the back button 164, an add batch button 1552 for adding a new batch to the batch table 1542, an unmatched payments button 1554 for viewing a table of unmatched payments, which are payments that have been received from customers without being matched to a batch, a search accounts button 1556 for searching accounts by account name or balance, and the logout button 180. The batch table 1542 includes identifying information for a plurality of batches, such as batch identification number, creation date, total amount, and status. A system operator may click on a link such as the batch identification number in order to view more details for the associated batch.

Figure 45:
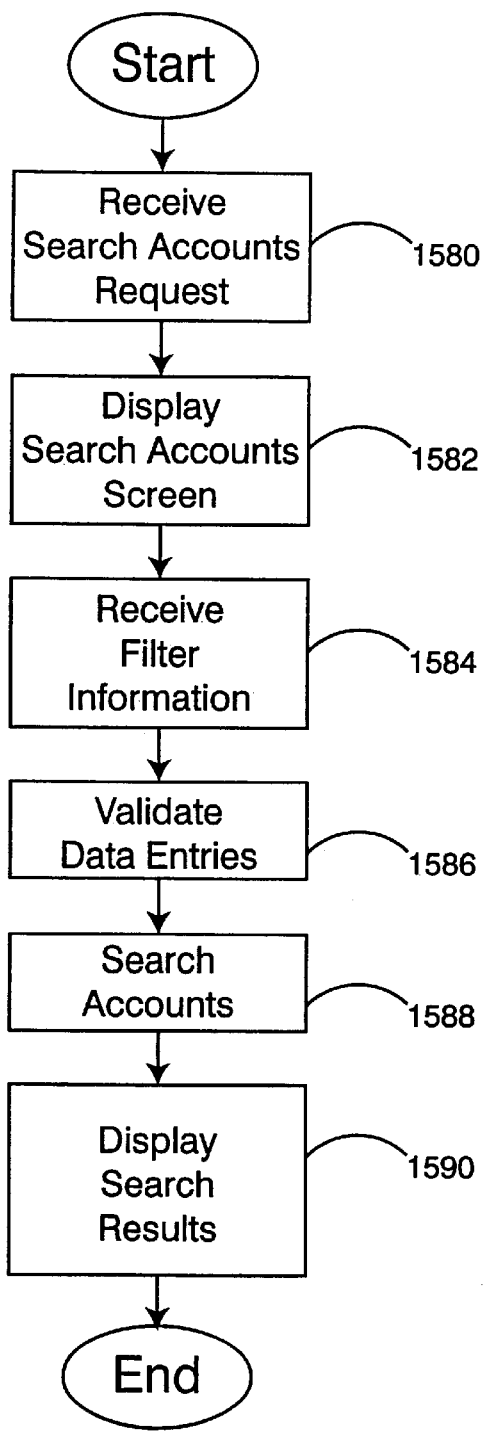
FIG. 45 is a flow diagram showing one embodiment of a process for searching accounts in the CPS.

FIG. 45 is a flow diagram showing one embodiment of a process for searching accounts in the account section 44 of the database server 32 through the other function section 80 of the convention processing engine 60. The method begins at step 1580 where the CPS 12 receives a search accounts request from the system operator. A system operator makes this request by clicking the search accounts button 1556 on the deposit batch screen 1540. At step 1582, the CPS 12 displays the search accounts screen to the system operator. At step 1584, the CPS 12 receives filter information from the system operator. After validating the data entries at step 1586, the CPS 12 searches the accounts in the account section 44 of the database server 32. At step 1590, the CPS 12 displays the results of the search in the search screen, at which point the method ends.

Figure 46:
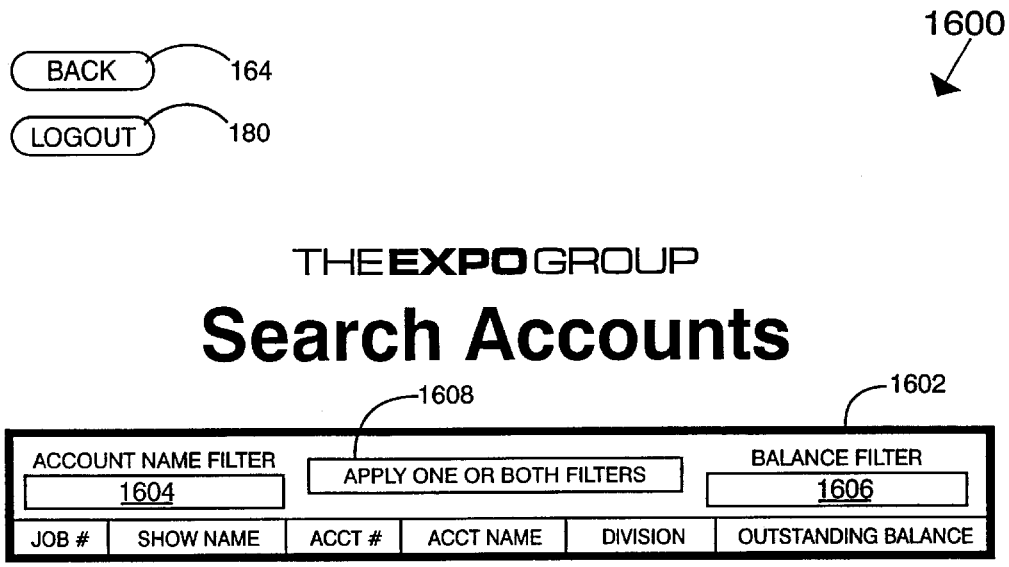
FIG. 46 is a screen diagram depicting one embodiment of a search account screen displayed to a user during the process of FIG. 45.

FIG. 46 is a screen diagram depicting one embodiment of a search account screen 1600. The search account screen 1600 includes a search table 1602, in addition to the back button 164 and the logout button 180. The search table 1602 includes identifying information for a plurality of accounts, such as job number, show name, account number, account name, division and outstanding balance. In order to search the accounts, the system operator enters an account name into an account name filter 1604 and/or a balance into a balance filter 1606. The system operator then clicks the apply filter button 1608, causing the CPS 12 to filter the accounts that are shown in the search table 1602. As a result, only the accounts with the corresponding account name and/or balance are shown in the search table 1602 after the search is completed.

Figure 47:
FIG. 47 is a screen diagram depicting one embodiment of an important dates screen displayed to a user upon selection of a show and the important dates function from the select show screen of FIG. 4.

FIG. 47 is a screen diagram depicting one embodiment of an important dates screen 1620. The important dates screen is displayed in response to a system operator selecting a show and clicking the important dates button 178 on the select show screen 160. The important dates button includes a date table 1622 and a plurality of buttons. The buttons include the back button 164, an add date button 1624 for adding a new date to the date table 1622, an edit date button 1626 for editing an existing date, a delete date button 1628 for removing a date from the date table 1622, and the logout button 180. The date table 1622 includes a list of important dates for the corresponding show, such as the discount deadline date, the convention processing company move-in and move-out dates, customer move-in and move-out dates, show open and close dates, dates that warehouse shipments will be received, dates that freight may be shipped direct-to-dock, and the like.

Thus, the CPS 12 provides a fully automated and flexible system for keeping customer and supplier accounts up to date, tracking freight, and processing orders, including date-sensitive costs and prices, multiple taxes, and separate cancellation dates and percentages.

Figure 48:
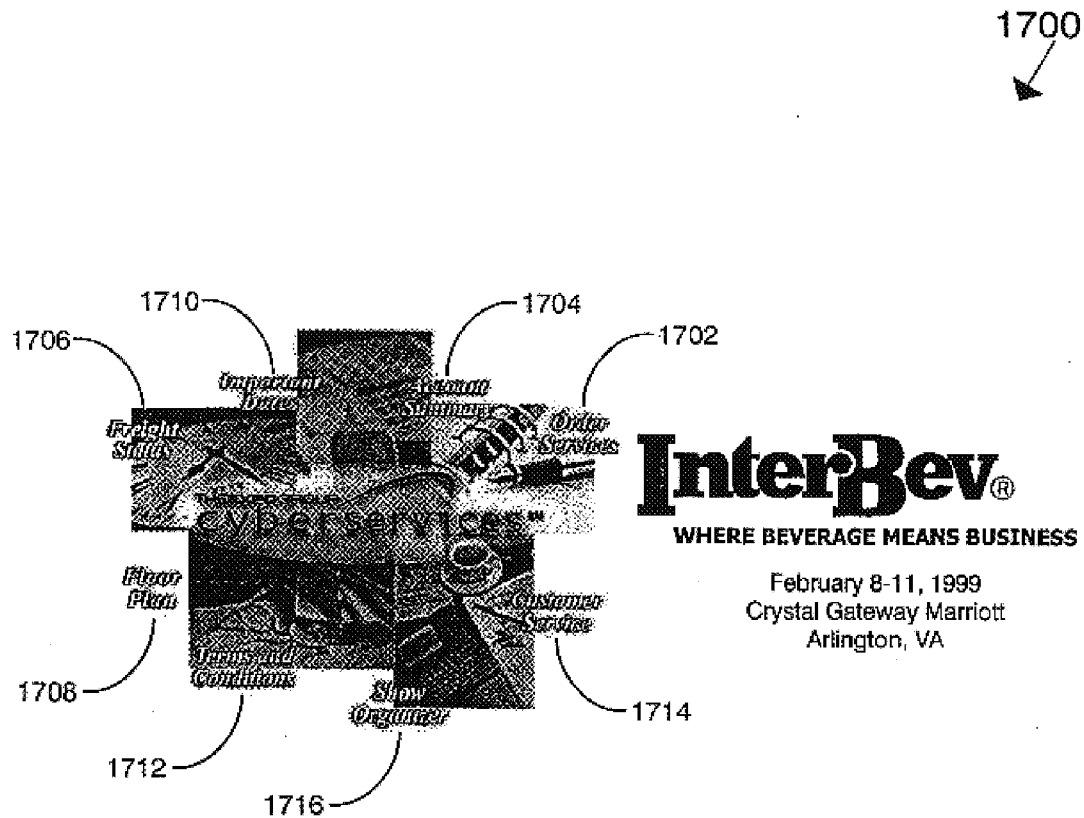
FIG. 48 is a screen diagram depicting one embodiment of a customer screen displayed to a user at a remote computer terminal and which provides an account summary, freight tracking, ordering services, and other customer functions.

FIG. 48 is a screen diagram depicting one embodiment of a customer screen 1700. The customer screen 1700 allows customers to remotely access the CPS 12 at any time to order items, track freight, check account summaries, view important dates, and the like. The customer screen 1700 includes a plurality of links to customer-accessible functions. These links include an order services link 1702, an account summary link 1704, a freight status link 1706, a floor plan link 1708, an important dates link 1710, a terms and conditions link 1712, a customer service link 1714, and a show organizer link 1716.

To access the customer screen 1700, a customer logs in to the CPS 12 through the customer interface 66 to the server engine 64, similarly to a system operator logging in through the service interface 62 to the convention processing engine 60 as described above in connection with FIG. 3. The customer may provide identifying information such as a name, a show identification number, a password, or the like. The CPS 12 validates the customer by verifying the login information. To accomplish this, the server engine 66 accesses the show section 40 and the accounts section 44 of the database server 32 and searches for a match. If the customer is validated, the CPS 12 displays the customer screen 1700 and allows the customer to access the customer's account, while protecting the integrity of other customers' accounts. If the customer was not validated, the CPS 12 re-displays the login screen for the customer to re-enter the login information.

After logging in, a customer may click the order services link 1702 on the customer screen 1700 in order to perform the functions included in the transactions section 91 of the server engine 64. For example, the customer may place orders for items, edit existing orders, cancel existing orders, make payments, and the like. These functions are accomplished similarly to the corresponding functions provided by the transactions section 76 of the convention processing engine 60 for the system operators. Thus, for example, when a customer is placing an order, the CPS 12 will display an order summary screen similar to order summary screen 1000 and allow the customer to proceed as a system operator would. This allows the customer to place an order, but does not allow the customer to access the add order screen 980 and select an order type 988. Instead, the order type is automatically included based on the date the order is being entered as compared to the discount deadline date 256.

By clicking the account summary link 1704, a customer may preview an account summary screen similar to account summary screen 900. However, the customer will not be provided with the ability to place an order, view notes, make adjustments, move booths, or carry a balance forward. The account summary preview will allow the customer to print this report to serve as a receipt displaying only orders, pre-paids, payments, adjustments, refunds and fees.

By clicking the freight status link 1706, a customer may access a freight screen similar to the select freight screen 1380. However, the customer will not be provided with the add freight button 1384, the edit freight button 1386, the delete freight button 1388, or the freight charges button 1390 of the select freight screen 1380. Thus, the customer may only view the status of the freight in the freight table 1382 for their account, but may not make changes to the freight orders.

When a customer clicks the floor plan link 1708, the CPS 12 displays the floor plan graphic file that is identified in the floor plan file name 280. This allows the customer to view the facility 236 where the convention will be held and to view where the customer's booth or booths are located relative to the remainder of the facility 236.

When a customer clicks the important dates link 1710, the CPS 12 displays an important dates screen similar to the important dates screen 1620. However, the customer will not be provided with the add date button 1624, the edit date button 1626, or the delete date button 1628 of the important dates screen 1620. Thus, the customer may view the important dates, but may not make changes to these dates. These dates may include, for example, the discount deadline date, the convention processing company move-in and move-out dates, customer move-in and move-out dates, show open and close dates, dates that warehouse shipments will be received, dates that freight may be shipped direct-to-dock, and the like.

By clicking the terms and conditions link 1712, a customer may view a variety of terms and conditions relating to the convention. For example, the terms and conditions may include legal information, such as credit card security, privacy policies and copyright notices, ordering information, such as payment policies and cancellation policies, and service information for services such as air, water, electricity, telecommunications, and the like.

When a customer clicks the customer service link 1714, the CPS 12 displays information regarding how and where to contact the convention processing company and/or one of its representatives. This information may include, for example, a representative name, phone number, fax number, e-mail address, and photograph. This gives customers quick access to the information needed to contact the convention processing company with questions or concerns.

By clicking the show organizer link 1716, a customer is able to access the convention organizer's web-site. This is a valuable tool for both the organizer and exhibitors, as it provides an exhibitor with quick access to information regarding the organizer of the convention at which the exhibitor will be exhibiting their wares.

Although the present invention has been described with several embodiments, various changes and modifications may be suggested to one skilled in the art. It is intended that the present invention encompass such changes and modifications as fall within the scope of the appended claims.

What is claimed is:

1. A convention processing system comprising software stored on a computer-readable medium, the software operable to:
   store information comprising show information identifying at least one show for an exhibition of one or more wares by a plurality of exhibitors, service information identifying a plurality of services available to the exhibitors at the show, supplier information identifying a plurality of different suppliers and at least one supplier for each of a plurality of service items;
   access the information;
   display the services for the show;
   receive a selection of a service item; and
   store the selection of the service item as an order.

2. The system of claim 1, wherein the supplier information identifies a plurality of suppliers for at least one service item.

3. The system of claim 1, the software further operable to:
   store booth information identifying a plurality of booths for the show, the booths comprising a plurality of pre-defined areas for the exhibition of the wares by the exhibitors at the show;
   assign a booth to an exhibitor; and
   associate each service item ordered by the exhibitor with the booth.

4. The system of claim 3, the software further operable to:
   store a placement grid booth for the show, the placement grid comprising a graphic representation of the booth;
   receive a selection of a service item for the booth of the exhibitor;
   display for the service item the placement grid for the booth; and
   receive a selection of a location on the placement grid for the service item.

5. The system of claim 3, the software further operable to store a booth assignment for each booth at the show, each booth assignment identifying the exhibitor to whom the booth is assigned and the service item associated with the booth.

6. The system of claim 1, the software further operable to:
store a service charge for a service item; and
automatically add the service charge to a balance of an exhibitor if the exhibitor orders the service item.

7. The system of claim 1, the software further operable to assign one or more accounting codes to each service.

8. The system of claim 1, the software further operable to:
associate a plurality of options with a service item; and
display the associated options if the service item is selected.

9. The system of claim 1, the software further operable to add a cost for the service item to a balance for the supplier.

10. The system of claim 1, the software further operable to determine in real-time an organizer profit margin, the organizer profit margin based on an organizer cost.

11. The system of claim 1, the software further operable to:
store a base amount for each show and a credit card identifier for each exhibitor;
compare a balance corresponding to an exhibitor for each exhibitor to the base amount; and
automatically charge the credit card identifier for each exhibitor with a balance greater than the base amount.

12. The system of claim 1, the show information comprising an Internet link to a web-site for an organizer of the show.

13. The system of claim 1, the software further operable to display a logo for an organizer of the show, the show information comprising a file location for a file comprising the logo.

14. The system of claim 1, the software further operable to display a floor plan of the show, the show information comprising a file location for a file comprising the floor plan.

15. The system of claim 1, the software further operable to:
store a plurality of batches of deposits and an account for each exhibitor, each account comprising an account name and a balance;
create the batches of deposits;
match a payment from an exhibitor with a batch; and
search the accounts by the account name or the balance.

16. A method for convention processing, comprising:
storing show information identifying at least one show for an exhibition of one or more wares by a plurality of exhibitors;
storing service information identifying a plurality of services available to the exhibitors at the show;
storing supplier information identifying a plurality of different suppliers and at least one supplier for each service item;
displaying the services for the show;
receiving a selection of a service item for an exhibitor;
storing the selection of the service item as an order; and
adding the price for the service item to a balance for the exhibitor.

17. The method of claim 16, further comprising storing the supplier information identifying a plurality of suppliers for at least one service.

18. The method of claim 16, further comprising providing in real-time information regarding a plurality of shipments of freight, the information including a weight and a status.

19. The method of claim 16, further comprising:
assigning a booth to an exhibitor; and
associating each service item ordered by the exhibitor with the booth.

20. The method of claim 16, further comprising determining in real-time an organizer profit margin, the organizer profit margin based on an organizer cost.

21. The method of claim 16, further comprising:
storing a base amount for each show;
storing a credit card identifier for each exhibitor;
comparing the balance for an exhibitor for each exhibitor to the base amount; and
automatically charging the credit card identifier for each exhibitor with greater than the base amount.

22. The method of claim 16, further comprising:
storing an account for each exhibitor, each account comprising an account name and a balance;
creating and storing a plurality of batches of deposits;
matching a payment from an exhibitor with a batch; and
searching the accounts by the account name or the balance.

23. A method for a convention exhibitor to order services for an exhibit at a convention, comprising:
accessing over a network a geographically remote convention processing system;
ordering with the convention processing system a plurality of convention-related services provided by a plurality of third-party suppliers, the suppliers being different from each other; and
wherein the convention processing system provides a single source for a plurality of carpeting, display, and furniture services.

24. A method for ordering convention services, comprising:
accessing a convention processing system over the Internet;
ordering with the convention processing system a plurality of service items by selecting the service items from a graphical interface of the convention processing system at least two of the service items being provided by different suppliers; and
wherein the convention processing system provides a single source for a plurality of carpeting, display, and furniture service items.

25. A method for receiving an order from an exhibitor of a plurality of exhibitors at a computer terminal remote from a convention processing system that stores a plurality of services for a show for an exhibition of one or more wares by the exhibitors and that stores at least one item for each service, comprising:
displaying a list of services for the show;
receiving a selection of a service;
displaying a list of items for the service;
receiving a selection of an item;
transmitting the selection of the item as an order to the convention processing system;
receiving from the convention processing system an automatically generated updated account summary including the order; and
displaying the updated account summary.

26. The method of claim 25, further comprising accessing in real-time information regarding a shipment of freight, the information including a weight and a status.

27. The method of claim 25, further comprising receiving a cancellation for the order for the item.

28. The method of claim 25, further comprising displaying a date relevant to the show.

29. A method for receiving an order from an exhibitor of a plurality of exhibitors at a computer terminal remote from a convention processing system that stores a plurality of services for a show for an exhibition of one or more wares by a plurality of exhibitors and that stores at least one item for each service, comprising:

- transmitting to the computer terminal for display a list of services for the show;
- receiving from the computer terminal a selection of a service;
- transmitting to the computer terminal for display a list of items for the service;
- receiving from the computer terminal a selection of an item as an order;
- automatically generating an updated account summary including the order; and
- transmitting to the computer terminal for display the updated account summary.

30. The method of claim 29, further comprising transmitting to the computer terminal in real-time information regarding a shipment of freight, the information including a weight and a status.

31. The method of claim 29, further comprising receiving from the computer terminal a cancellation for the order for the item.

32. The method of claim 29, further comprising transmitting to the computer terminal for display a date relevant to the show.

* * * * *